United States Patent
Khasnis et al.

(10) Patent No.: US 9,251,498 B2
(45) Date of Patent: Feb. 2, 2016

(54) FACILITATING DEPLOYMENT OF CUSTOMIZATIONS OF ENTERPRISE APPLICATIONS

(75) Inventors: Abhijit Suresh Khasnis, Bangalore (IN); Ramesha Sheernali G, Bangalore (IN); Bakash Shaik, Bangalore (IN); Yilun Shang, Hayward, CA (US); Mancang Tian, Hayward, CA (US); Jiaren Wu, San Mateo, CA (US); Xiangyang Su, Foster City, CA (US); Hans Kedefors, Hillsborough, CA (US); Chin-Heng Hong, Hillsborough, CA (US); Ashraf Sayed Alyan, Sunnyvale, CA (US); Hongxing Li, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1764 days.

(21) Appl. No.: 11/874,208

(22) Filed: Oct. 18, 2007

(65) Prior Publication Data

US 2008/0098099 A1 Apr. 24, 2008

Related U.S. Application Data

(60) Provisional application No. 60/862,468, filed on Oct. 23, 2006.

(51) Int. Cl.
*G06F 15/177* (2006.01)
*G06F 9/46* (2006.01)
(Continued)

(52) U.S. Cl.
CPC ...... *G06Q 10/10* (2013.01); *G06F 8/61* (2013.01); *G06F 9/45558* (2013.01); *H04L 67/10* (2013.01)

(58) Field of Classification Search
CPC .............. G06F 8/60; G06F 8/61; G06F 8/65; G06F 9/44505; G06F 9/45558; G06F 17/30445; G06F 9/5072; H04L 41/0813; H04L 67/10; H04W 24/02
USPC .................. 709/220; 717/176; 707/104.1, 203
See application file for complete search history.

(56) References Cited

U.S. PATENT DOCUMENTS 6,018,575 A * 1/2000 Gross et al. .............. 379/220.01
6,687,677 B1 * 2/2004 Barnard et al. ................... 705/7
(Continued)

OTHER PUBLICATIONS

Edson Manoel, Desmond Krishna, Randy Watson, Creighton Hicks: "End to End Automation with IBM Tivoli System Automation for Multiplatforms" Dec. 13, 2005; IBM RedBook.*

(Continued)

*Primary Examiner* — Arvin Eskandarnia
*Assistant Examiner* — Margishi Desai
(74) *Attorney, Agent, or Firm* — Iphorizons PLLC; Narendra Reddy Thappeta

(57) ABSTRACT

A management system facilitating deployment of customizations of an enterprise application, with the enterprise application containing software modules pre-installed on a set of servers. In an embodiment, the management system first receives a set of deployment units each containing data defining a manner of configuration affecting the operation of at least some of the software modules to attain the desired customizations, and an enterprise profile indicating the specific subset of deployment units to be deployed in each of the servers. Management system then orchestrates the configuration of the software modules installed on the set of servers according to the data specified in the set of deployment units and the enterprise profile.

25 Claims, 25 Drawing Sheets

(51) Int. Cl.
*G06F 7/04* (2006.01)
*G06Q 10/10* (2012.01)
*G06F 9/445* (2006.01)
*H04L 29/08* (2006.01)
*G06F 9/455* (2006.01)

(56) References Cited

U.S. PATENT DOCUMENTS

| | | | |
|---|---|---|---|
| 6,842,856 B2* | 1/2005 | Shenassa et al. | 713/1 |
| 6,922,723 B1* | 7/2005 | Sharp et al. | 709/221 |
| 6,944,653 B2* | 9/2005 | Fong et al. | 709/220 |
| 6,986,135 B2 | 1/2006 | Leathers et al. | |
| 7,013,331 B2* | 3/2006 | Das | 709/220 |
| 7,155,462 B1* | 12/2006 | Singh et al. | 717/170 |
| 7,178,129 B2* | 2/2007 | Katz | 717/108 |
| 7,263,686 B2* | 8/2007 | Sadiq | 717/110 |
| 7,409,675 B2* | 8/2008 | Brumme et al. | 717/114 |
| 7,421,484 B2* | 9/2008 | Das | 709/220 |
| 7,436,840 B1* | 10/2008 | Hoffman et al. | 370/401 |
| 7,487,191 B2* | 2/2009 | Castro et al. | 707/204 |
| 7,490,073 B1* | 2/2009 | Qureshi et al. | 706/50 |
| 7,493,653 B2* | 2/2009 | Klein | 726/3 |
| 7,519,711 B2* | 4/2009 | Mohindra et al. | 709/226 |
| 7,580,946 B2* | 8/2009 | Mansour et al. | 707/102 |
| 7,607,126 B2* | 10/2009 | Read | 717/172 |
| 7,661,108 B2* | 2/2010 | Sengodan | 719/315 |
| 7,676,473 B2* | 3/2010 | Alperin et al. | 707/999.01 |
| 2002/0124245 A1* | 9/2002 | Maddux et al. | 717/176 |
| 2002/0131404 A1* | 9/2002 | Mehta et al. | 370/352 |
| 2003/0046586 A1* | 3/2003 | Bheemarasetti et al. | 713/201 |
| 2003/0147350 A1* | 8/2003 | Wookey et al. | 370/231 |
| 2003/0149740 A1* | 8/2003 | Wookey et al. | 709/217 |
| 2003/0229884 A1* | 12/2003 | Carr et al. | 717/101 |
| 2004/0181794 A1* | 9/2004 | Coleman et al. | 718/104 |
| 2005/0185611 A1* | 8/2005 | Torarp | H04W 24/02 370/328 |
| 2005/0193033 A1* | 9/2005 | Davis et al. | 707/201 |
| 2005/0262499 A1* | 11/2005 | Read | 717/172 |
| 2006/0074729 A1* | 4/2006 | Capotosto et al. | 705/8 |
| 2006/0080413 A1* | 4/2006 | Oprea et al. | 709/220 |
| 2006/0112073 A1* | 5/2006 | Jensen et al. | 707/2 |
| 2006/0143601 A1* | 6/2006 | Concha et al. | 717/170 |
| 2006/0168574 A1* | 7/2006 | Giannini et al. | 717/168 |
| 2006/0173912 A1* | 8/2006 | Lindvall et al. | 707/104.1 |
| 2006/0190486 A1* | 8/2006 | Zhou et al. | 707/104.1 |
| 2006/0282638 A1* | 12/2006 | Oshima et al. | 711/170 |
| 2006/0293023 A1* | 12/2006 | Levitan | 455/404.2 |
| 2007/0100965 A1* | 5/2007 | Schweier | 709/218 |
| 2007/0124098 A1* | 5/2007 | Basham et al. | 702/120 |
| 2007/0150480 A1* | 6/2007 | Hwang et al. | 707/10 |
| 2007/0192003 A1* | 8/2007 | Hashiba | 701/37 |
| 2007/0192769 A1* | 8/2007 | Mimura et al. | 719/316 |
| 2007/0198988 A1* | 8/2007 | Kumar et al. | 719/313 |
| 2007/0201679 A1* | 8/2007 | Baggenstoss et al. | 379/265.06 |
| 2007/0208705 A1* | 9/2007 | Whitehead | 707/3 |
| 2007/0258388 A1* | 11/2007 | Bose | 370/254 |
| 2007/0260702 A1* | 11/2007 | Richardson et al. | 709/217 |
| 2007/0271276 A1* | 11/2007 | Allen et al. | 707/10 |
| 2008/0033986 A1* | 2/2008 | McCusker et al. | 707/102 |
| 2008/0040455 A1* | 2/2008 | MacLeod et al. | 709/220 |
| 2008/0071888 A1* | 3/2008 | Cohen | H04L 67/34 709/220 |
| 2008/0133303 A1* | 6/2008 | Singh et al. | 705/8 |
| 2008/0168424 A1* | 7/2008 | Mohindra et al. | 717/120 |
| 2008/0209392 A1* | 8/2008 | Able et al. | 717/105 |
| 2008/0256531 A1* | 10/2008 | Gao et al. | 717/177 |
| 2008/0275935 A1* | 11/2008 | Mohindra et al. | 709/201 |
| 2008/0301231 A1* | 12/2008 | Mehta et al. | 709/204 |
| 2009/0024638 A1* | 1/2009 | Bangel et al. | 707/10 |
| 2009/0031313 A1* | 1/2009 | Tian | 718/102 |
| 2009/0094364 A1* | 4/2009 | Stevens et al. | 709/226 |
| 2009/0144721 A1* | 6/2009 | Wagner et al. | 717/172 |
| 2009/0271432 A1* | 10/2009 | Shankar et al. | 707/102 |
| 2010/0235442 A1* | 9/2010 | Zhang et al. | 709/203 |

OTHER PUBLICATIONS

"Microsoft CRM Implementation Guide—Customizing Microsoft CRM", "1. http://www.microsoft.com/technet/prodtechnol/mscrm/mscrm1/maintain/19_custm.mspx#EUC", Downloaded circa: Oct. 16, 2006, pp. 1 to 4.

"Step 5: Deploying Your Customization to the Websphere Commerce Server", "http://publib.boulder.ibm.com/infocenter/wchelp/v6r0m0/index.jsp?topic=/com.ibm.commerce.giftcenter.refapp.doc/tutorial/tgcibmgiftcentercustomization44.htm", Downloaded circa: Oct. 16, 2006, pp. 1 to 7.

"Step 8: Deploy Your Changes", "http://publib.boulder.ibm.com/infocenter/wchelp/v6r0m0/index.jsp?topic=/com.ibm.commerce.telesales.developer.doc/tutorial/ttradvanced_7.htm", Downloaded circa: Oct. 16, 2006, pp. 1 to 8.

* cited by examiner

```
601: <?xml version="1.0" encoding="UTF-8" ?>
602: <SiebelMessage>
603:   <_ und_undPROPERTIES_und_und>
604:     <TransactionName>LOV</TransactionName>
605:     <ExportFilePath>\\sdchs20n370\upload</ExportFilePath>
606:     <TransactionLogFilePath>m:\siebel\temp\42-59V6A.log</TransactionLogFilePath>
607:     <TransactionId>42-59V6B</TransactionId>
608:   </_ und_undPROPERTIES_und_und>
609:   <EAIMessage>
610:     <_ und_undPROPERTIES_und_und>
611:       <DataTypeName>LOV</DataTypeName>
612:       <MessageType>Integration Object</MessageType>
613:       <EAIMethod>Synchronize</EAIMethod>
614:     </_ und_undPROPERTIES_und_und>
615:     <ListOfUDA_spcList_spcOf_spcValues>
616:       <List_spcOf_spcValues_spcParent_spc_lprUDA_rpr>
617:         <_ und_undPROPERTIES_und_und>
618:           <Order_spcBy />
619:           <Value>ATTR_HIER_LEVEL_LIMIT</Value>
620:           <Translate>N</Translate>
621:           <High />
622:           <Multilingual>N</Multilingual>
623:           <Modifiable>N</Modifiable>
624:           <Class_spcCode />
625:           <Type>LOV_TYPE</Type>
626:           <Low />
627:           <Active>Y</Active>
628:           <Replication_spcLevel>All</Replication_spcLevel>
629:           <Name>ATTR_HIER_LEVEL_LIMIT</Name>
630:           <Description />
631:         </_ und_undPROPERTIES_und_und>
632:         <ListOfList_spcOf_spcValues_spcChild_spc_lprUDA_rpr>
```

FIG. 6A

```
633: <List_spcOf_spcValues_spcChild_spc_lprUDA_rpr>
634:   <__und_undPROPERTIES_und_und>
635:     <Order spcBy />
636:     <Value>9</Value>
637:     <Translate>N</Translate>
638:     <Parent_spcLanguage />
639:     <Language>ENU</Language>
640:     <High />
641:     <Default_spcLIC_spcFlag>N</Default_spcLIC_spcFlag>
642:     <Multilingual>N</Multilingual>
643:     <Modifiable>N</Modifiable>
644:     <Parent_spcValue />
645:     <Parent />
646:     <Target_spcLow />
647:     <Class_spcCode />
648:     <Type>ATTR_HIER_LEVEL_LIMIT</Type>
649:     <Low />
650:     <Target_spcHigh />
651:     <Parent_spcOrganization />
652:     <Parent_spcSub_spcType />
653:     <Sub_spcType />
654:     <Weighting_spcFactor />
655:     <Active>Y</Active>
656:     <Replication_spcLevel>All</Replication_spcLevel>
657:     <Organization />
658:     <Name>Limit</Name>
659:     <Description />
660:   </__und_undPROPERTIES_und_und>
661: </List_spcOf_spcValues_spcChild_spc_lprUDA_rpr>
662:   </ListOfList_spcOf_spcValues_spcChild_spc_lprUDA_rpr>
663:   </List_spcOf_spcValues_spcParent_spc_lprUDA_rpr>
664: </ListOfUDA_spcList_spcOf_spcValues>
665: </EAIMessage>
666: </SiebelMessage>
```

*FIG. 6B*

```
721: <?xml version="1.0" encoding="UTF-8" ?>
722: <ADMPackage ActivateOnly="FALSE" Created="2006-05-05 14:05:42" CreatedByPackagerVersion="1.0" FileFormatVersion="1.0"
723:   Description="Package descriptor file created by ADM Packager." LastValidated="2006-05-05 14:05:42" SystemImpact="Rolling server restart">

724: <Group Category="File" Name="File Group - Reports - Application Server">
725:   <DeploymentUnit DataFile="file/AppServer/reports/ENU/aclist1.rox" DeploymentType="Reports - Application Server"/>
726:   <DeploymentUnit DataFile="file/AppServer/reports/ENU/aclist2.rox" DeploymentType="Reports - Application Server"/>
727: </Group>

728: <Group Category="File" Name="File Group - Webmaster">
729:   <DeploymentUnit DataFile="file/AppServer/webmaster/enu/images/image_1.gif" DeploymentType="Webmaster" />
730:   <DeploymentUnit DataFile="file/AppServer/webmaster/enu/images/image_2.gif" DeploymentType="Webmaster" />
731:   <DeploymentUnit DataFile="file/AppServer/webmaster/enu/images/image_3.gif" DeploymentType="Webmaster" />
732: </Group>

733: <Group Category="Database" Name="Database Group - Responsibility">
734:   <DeploymentUnit DataFile="database/42H4V_Resp.xml" DescriptorFile="database/42H4V_Resp_des.xml" DeploymentType="Responsibility" />
735:   <DeploymentUnit DataFile="database/44H4V_Resp.xml" DescriptorFile="database/44H4V_Resp_des.xml" DeploymentType="Responsibility" />
736:   <DeploymentUnit DataFile="database/45H4V_Resp.xml" DescriptorFile="database/45H4V_Resp_des.xml" DeploymentType="Responsibility" />
737:   <DeploymentUnit DataFile="database/47H4V_Resp.xml" DescriptorFile="database/47H4V_Resp_des.xml" DeploymentType="Responsibility" />
738: </Group>

739: <Group Category="Database" Name="Database Group - Business Rule">
740:   <DeploymentUnit DataFile="database/42H4V_Rules.xml" DescriptorFile="database/42H4V_Rules_des.xml" DeploymentType="Business Rule" />
741:   <DeploymentUnit DataFile="database/44H4V_Rules.xml" DescriptorFile="database/44H4V_Rules_des.xml" DeploymentType="Business Rule" />
742:   <DeploymentUnit DataFile="database/45H4V_Rules.xml" DescriptorFile="database/45H4V_Rules_des.xml" DeploymentType="Business Rule" />
743: </Group>

744: <Group Category="Repository" Name="Repository Group">
745:   <DeploymentUnit DataFile="repository/bcs.sif" DescriptorFile="repository/bcs_des.xml" DeploymentType="Business Component" />
746:   <DeploymentUnit DataFile="repository/busvc.sif" DescriptorFile="repository/busvc_des.xml" DeploymentType="Business Service" />
747: </Group>

748: </ADMPackage>
```

*FIG. 7*

```
801: <?xml version="1.0" encoding="UTF-8" ?>
802: <adm_registry xmlns:xsi="http://www.w3.org/2001/XMLSchema-instance" xsi:noNamespaceSchemaLocation="adm_registry.xsd" version="1.0">
803:   <deployment_category name="Database">
804:     <deployment_level>Unit</deployment_level>
805:     <mbean><type>ADM:type=ADMDataMBean</type> <version>1.0</version> </mbean>
806:     <validation_rule>
807:       <validation_method>ServerComponent</validation_method>
808:       <component><name>ADMObjMgr</name> <status>Online, Running</status> </component>
809:       <component><name>ADMProc</name> <status>Online, Running</status> </component>
810:     </validation_rule>
811:     <default_operations>
812:       <operation name="Backup" type="EAI" />
813:       <operation name="Deploy" type="EAI">
814:         <validation_rule><validation_method>CheckSchemaVersion</validation_method> </validation_rule>
815:       </operation>
816:       <operation name="Activate" type="Not Applicable" />
817:       <operation name="Restore" type="EAI" delete_new_objects="Yes" />
818:       <operation name="RestoreActivate" type="Not Applicable" />
819:     </default_operations>
820:     <deployment_type name="Business Rule" system_impact="No impact">
821:       <operations>
822:         <operation name="Backup" type="BusinessService" service_name="Rule Runtime Administration" method_name="Backup" />
823:         <operation name="Deploy" type="BusinessService" service_name="Rule Runtime Administration" method_name="Deploy" />
824:         <operation name="Activate" type="BusinessService" service_name="Rule Runtime Administration" method_name="Activate" />
825:         <operation name="Restore" type="BusinessService" service_name="Rule Runtime Administration" method_name="Restore" />
826:         <operation name="RestoreActivate" type="BusinessService" service_name="Rule Runtime Administration"
                           method_name="RestoreActivate" />
827:       </operations>
828:     </deployment_type>
829:     <deployment_type name="Correspondence template" system_impact="No impact" />
830:     <deployment_type name="Responsibility" system_impact="No impact"/>
831:   </deployment_category>
```

*FIG. 8A*

```
832:  <deployment_category name="File">
833:    <deployment_level>Group</deployment_level>
834:    <mbean><type>ADM:type=ADMFileMBean</type> <version>1.0</version></mbean>
835:    <default_operations>
836:      <operation name="Backup" type="MBean" />
837:      <operation name="Deploy" type="MBean" />
838:      <operation name="Activate" type="Not Applicable" />
839:      <operation name="Restore" type="MBean" />
840:      <operation name="RestoreActivate" type="Not Applicable" />
841:    </default_operations>
842:    <deployment_type name="Reports - Application Server" system_impact="No impact">
843:      <parameters>
844:        <parameter name="TargetServerType" value="AppServer" />
845:        <parameter name="DestinationDirectory" value="reports/%LANG%" />
846:        <parameter name="ValidFileExtensions" value="rox,txt" />
847:      </parameters>
848:    </deployment_type>
849:    <deployment_type name="SRF" system_impact="Rolling server restart">
850:      <parameters>
851:        <parameter name="TargetServerType" value="AppServer" />
852:        <parameter name="DestinationDirectory" value="objects/%LANG%" />
853:        <parameter name="ValidFileExtensions" value="srf" />
854:      </parameters>
855:    </deployment_type>
856:    <deployment_type name="Webmaster" system_impact="User reconnect">
857:      <parameters>
858:        <parameter name="TargetServerType" value="AppServer" />
859:        <parameter name="DestinationDirectory" value="webmaster" />
860:        <parameter name="ValidFileExtensions" value="gif,html,jpg,css,js" />
861:      </parameters>
862:      <operations>
863:        <operation name="Activate" type="BusinessService" service_name="Web Public File synchronization service" method_name="TriggerFileSync">
```

*FIG. 8B*

```
864:    <validation_rule>
865:       <validation_method>ServerComponent</validation_method>
866:       <component><name>ADMObjMgr</name> <status>Online, Running</status> </component>
867:       <component><name>ADMProc</name> <status>Online, Running</status> </component>
868:    </validation_rule>
869:   </operation>
870:  </operations>
871: </deployment_type>
872: <deployment_category>
873: <deployment_category name="Repository">
874:  <deployment_level>Unit</deployment_level>
875:  <mbean><type>ADM:type=ADMDataMBean</type> <version>1.0</version> </mbean>
876:  <validation_rule>
877:     <validation_method>ServerComponent</validation_method>
878:     <component><name>ADMObjMgr</name> <status>Online, Running</status> </component>
879:     <component><name>ADMProc</name> <status>Online, Running</status> </component>
880:  </validation_rule>
881:  <default_operations>
882:     <operation name="Backup" type="BusinessService" service_name="Deployment Support for ADM" method_name="Backup" />
883:     <operation name="Deploy" type="BusinessService" service_name="Deployment Support for ADM" method_name="Deploy" />
884:     <operation name="Activate" type="Not Applicable" />
885:     <operation name="Restore" type="BusinessService" service_name="Deployment Support for ADM"
                                                                    method_name="Restore" delete_new_objects="Yes" />
886:     <operation name="RestoreActivate" type="Not Applicable" />
887:  </default_operations>
888:  <deployment_type name="Workflow Process" system_impact="No impact">
889:     <operations>
890:        <operation name="Activate" type="BusinessService" service_name="Deployment Support for ADM" method_name="Activate" />
891:        <operation name="RestoreActivate" type="BusinessService" service_name="Deployment Support for ADM"
                                                                     method_name="RestoreActivateProcess" />
892:     </operations>
893:  </deployment_type>
894: </deployment_category>
895: </adm_registry>
```

*FIG. 8C*

```
911: <?xml version="1.0" encoding="UTF-8" ?>
912: <EnterpriseProfile Name="Siebel Profile" Description="Target enterprise related parameters" EnterpriseName="ACME" Status="Active" >
913:   <EnterpriseTargetServerInformation>
914:     <ServerInfo AgentName="server1" SiebelServerConnectString="acme://server1:2321/siebel/ADMObjMgr_enu" ServerInstallDir="M:\siebel" />
915:     <ServerInfo AgentName="server2" SiebelServerConnectString="acme://server2:2321/siebel/ADMObjMgr_enu" ServerInstallDir="M:\siebel" />
916:     <ServerInfo AgentName="server3" SiebelServerConnectString="acme://server3:2321/siebel/ADMObjMgr_enu" ServerInstallDir="M:\siebel" />
917:     <ServerInfo AgentName="server4" SiebelServerConnectString="acme://server4:2321/siebel/ADMObjMgr_enu" ServerInstallDir="M:\siebel" />
918:     <ServerInfo AgentName="server5" SiebelServerConnectString="acme://server5:2321/siebel/ADMObjMgr_enu" ServerInstallDir="M:\siebel" />
919:     <ServerInfo AgentName="server6" SiebelServerConnectString="acme://server6:2321/siebel/ADMObjMgr_enu" ServerInstallDir="M:\siebel" />
920:   </EnterpriseTargetServerInformation>
921:   <Params>
922:     <StopOnError>Yes</StopOnError>
923:     <PerformValidation>No</PerformValidation>
924:     <PerformBackup>Yes</PerformBackup>
925:     <ReportServerUserName>nlmda</ReportServerUserName>
926:     <ReportServerPassword Encrypted="Yes">XsH8RONaENE=</ReportServerPassword>
927:   </Params>
928:   <Category Name="File" Description="File deployment">
929:     <DeployServerList>
930:       <DeployServer>server1</DeployServer>
931:       <DeployServer>server2</DeployServer>
932:       <DeployServer>server3</DeployServer>
933:       <DeployServer>server4</DeployServer>
934:     </DeployServerList>
935:     <Params>
936:       <DegParallelism>2</DegParallelism>
937:     </Params>
938:     <DeploymentType Name="SRF" Description="Siebel Repository File">
939:       <DeployServerList>
940:         <DeployServer>server3</DeployServer>
940:         <DeployServer>server4</DeployServer>
941:         <DeployServer>server5</DeployServer>
942:       </DeployServerList>
943:       <Params>
944:         <TargetRepository>siebel</TargetRepository>
945:         <ADMBackupDir>\\sdchs20n270\upload</ADMBackupDir>
946:         <DestinationRoot>$SIEBEL_ROOT$</DestinationRoot>
947:       </Params>
948:     </DeploymentType>
```

FIG. 9A

```
949:    <DeploymentType Name="Webmaster">
950:        <DeployServerList>
951:            <DeployServer>server1</DeployServer>
952:            <DeployServer>server2</DeployServer>
953:            <DeployServer>server3</DeployServer>
954:            <DeployServer>server4</DeployServer>
955:            <DeployServer>server5</DeployServer>
956:        </DeployServerList>
957:        <Params>
958:            <DestinationRoot>\\sdchs20n370\upload</DestinationRoot>
959:            <WebServerHosts>http://sdchs20n370</WebServerHosts>
960:            <ApplicationPath>/callcenter_enu/start.swe</ApplicationPath>
961:        </Params>
962:    </DeploymentType>
963:    <Category Name="Database">
964:        <DeployServerList>
965:            <DeployServer>server1</DeployServer>
966:        </DeployServerList>
967:        <Params>
968:            <ADMBackupDir>\\sdchs20n370\upload</ADMBackupDir>
969:            <DegParallelism>2</DegParallelism>
970:            <WFPolicyActSrvr>sdchs20n370_1199</WFPolicyActSrvr>
971:        </Params>
972:    </Category>
973:    <Category Name="Repository">
974:        <Dependencies Action="DEPLOY">
975:            <Dependency Category="Database" Status="DEPLOYMENT_COMPLETE" />
976:            <Dependency Category="File" Status="MIGRATION_COMPLETE" />
977:        </Dependencies>
978:        <DeployServerList>
979:            <DeployServer>server2</DeployServer>
980:        </DeployServerList>
981:        <Params>
982:            <TargetRepository>Siebel Repository</TargetRepository>
983:            <ADMBackupDir>\\sdchs20n370\upload</ADMBackupDir>
984:            <DegParallelism>1</DegParallelism>
985:        </Params>
986:    </Category>
987: </EnterpriseProfile>
```

FIG. 9B

1210 → > deploy load PGN PGN SRF
1215 → Success Package 'SRF' has been successfully loaded into database. ErrorLevel is set to 0
       MS exits with SUCCESS 1220 → > deploy create PGN PGN SRF
1225 → Success Session was created successfully for Package 'SRF'. ErrorLevel is set to 0
       MS exits with SUCCESS 1230 → > deploy copy PGN PGN SRF
1235 → Terminate batch job (Y/N)? y 1240 → > deploy copy PGN PGN SRF
1245 → Failure A deploy session is actively running. There can only be one actively running session. (SBL_DMI_00175) ErrorLevel is set to 2
       MS exits with FAILURE 1250 → > deploy stop PGN PGN SRF
1255 → Success Deploy session was cancelled.ErrorLevel is set to 0
       MS exits with SUCCESS 1260 → > deploy copy PGN PGN SRF
1265 → Failure Deploy operation has already been completed for package 'SRF' (SBL-DMI-00360) ErrorLevel is set to 2
       MS exits with FAILURE 1270 → > deploy acknowledge PGN PGN SRF
1275 → Success Acknowledge completed for package 'SRF' ErrorLevel is set to 0
       MS exits with SUCCESS 1280 → > deploy create PGN PGN SRF
1285 → Success Session was created successfully for package 'SRF' ErrorLevel is set to 0
       MS exits with SUCCESS 1290 → > deploy copy PGN PGN SRF
1295 → Success Command completed successfully.
       ErrorLevel is set to 0
       MS exits with SUCCESS

1610 → > deploy copy PGN PGN pavan

1615 → Failure some of the current deploy/restore requests failed, please use 'status' command to list the detail status 1630 → > deploy restore_session PGN PGN pavan 1635 → Success Restore session for package 'pavan' is created.
Note that the restore operation may not be applicable for some of the units.
This can be the case if the deployment was not completed, or backup was turned off in enterprise profile, or restore operation 1650 → > deploy restore_session PGN PGN pavan -async 1655 → Success Restore session for package 'pavan' started.

1680 → > deploy track PGN PGN pavan

Success Command completed successfully.

```
1671: <?xml version="1.0" encoding="UTF-8" ?>
1672: <SiebelMessage TransactionId="" TransactionLogFilePath="" ExportFilePath="\\sdchs20n370\upload\LOV\1527\Db">
1673: <EAIMessage SessionItemName="LOV" MessageType="Integration Object" EAIMethod="Synchronize">
1674:   <ListOfUDA_spcList_spcOf_spcValues>
1675:     <List_spcOf_spcValues_spcParent_spc_lprUDA_rpr Order_spcBy="" Value="" ATTR_HIER_LEVEL_LIMIT" Translate="N"
1676:         High="" Multilingual="N" Modifiable="N" Class_spcCode="" Type="LOV_TYPE" Low="" Active="Y"
1677:         Replication_spcLevel="All" Name="ATTR_HIER_LEVEL_LIMIT" Description="">
1678:       <ListOfList_spcOf_spcValues_spcChild_spc_lprUDA_rpr>
1679:         <List_spcOf_spcValues_spcChild_spc_lprUDA_rpr Order_spcBy="" Value="g" Translate="N"
1680:             Parent_spcLanguage="" Language="ENU" High="" Default_spcLIC_spcFlag="N"
1681:             Multilingual="N" Modifiable="N" Parent_spcValue="" Parent="" Target_spcLow=""
1682:             Class_spcCode="" Type="ATTR_HIER_LEVEL_LIMIT" Low="" Target_spcHigh=""
1683:             Parent_spcOrganization="" Parent_spcSub_spcType="" Sub_spcType=""
1684:             Weighting_spcFactor="" Active="Y" Replication_spcLevel="All" Organization=""
1685:             Name="Limit" Description="">
1686:           <ListOfLanguage_spcDef>
1687:             <Language_spcDef Language_spcCode="ENU" Language_spcName="English-American" />
1688:           </ListOfLanguage_spcDef>
1689:         </List_spcOf_spcValues_spcChild_spc_lprUDA_rpr>
1690:       </ListOfList_spcOf_spcValues_spcChild_spc_lprUDA_rpr>
1691:     </List_spcOf_spcValues_spcParent_spc_lprUDA_rpr>
1692:   </ListOfUDA_spcList_spcOf_spcValues>
1693: </EAIMessage>
1694: </SiebelMessage>
```

*FIG. 16B*

FACILITATING DEPLOYMENT OF CUSTOMIZATIONS OF ENTERPRISE APPLICATIONS

RELATED APPLICATION

The present application is related to and claims priority from the co-pending U.S. provisional patent application entitled "Facilitating Deployment of Customizations of Enterprise Applications", application Ser. No. 60/862,468, filed on Oct. 23, 2006, naming as inventors Khasnis et al as in the subject patent application, and is incorporated in its entirety herewith.

BACKGROUND

1. Technical Field

The present disclosure relates to enterprise applications and more specifically to facilitating deployment of customizations of enterprise applications.

2. Related Art

Enterprise applications refer to a class of applications tailored for specific business contexts (banking, finance, sales, supply chain management, etc.), typically executed on multiple servers for reasons such as scalability, redundancy and performance, as is well known in the relevant arts.

Customer relationship management (CRM) applications are a class of enterprise applications which simplify an enterprise's interaction with customers in the corresponding context. CRM applications are used in environments such as call centers, where there is a substantial amount of interaction between customers and the call center employees typically to address various issues/concerns raised by the customers.

Enterprise applications also often need to be customized, primarily to adapt (as opposed to fixing of bugs/errors in the software code of) a vendor-provided enterprise application to the specific requirements and needs of the particular enterprise. The software code forming the enterprise application is typically deployed in a state suitable for execution, and further adaptations are made after such deployment. These adaptations are referred to as customizations.

As an example, different enterprises may desire to display their respective images/logos (or messages) on the corresponding user interfaces provided by the same enterprise application executing in their respective environments. However, customizations may be more complex, and often include, for example, additional data, modules (software code providing specific features), and rules/workflows/validations (e.g., in the form of scripts), which control the sequence/timing in which the base modules (contained in the installed enterprise application) are executed for a desired process flow, etc.

In the case of CRM applications noted above, a vendor may install the CRM application software with a basic set of features, and customizations may need to be developed, tested and deployed to meet the enterprise specific requirements.

It is generally desirable that the deployment of customizations be facilitated while meeting one or more of objectives such as simplicity, efficiency, recovery, and speed.

BRIEF DESCRIPTION OF THE DRAWINGS

Example embodiments of the present invention will be described with reference to the accompanying drawings briefly described below.

FIGS. 6A and 6B together depict a portion of a database input file containing data corresponding to rows to be written to a database during deployment in one embodiment.

FIG. 7 depicts a portion of a descriptor data indicating the types of deployment units used for customizing an enterprise application in one embodiment.

FIGS. 8A, 8B and 8C together depicts a portion of a management information indicating a manner of configuration of the software modules (constituting an enterprise application) corresponding to the types of deployment units in one embodiment.

FIGS. 9A and 9B together depicts a portion of an enterprise profile indicating the specific deployment units to be used to customize an enterprise application on each of the servers executing the enterprise application in one embodiment.

FIG. 12 depicts the manner in which deployment of deployment units is stopped and later resumed in an embodiment.

FIG. 16A indicates the manner in which a rollback indication may be specified in one embodiment.

FIG. 16B depicts a backup data that is maintained in a local database on receiving a backup indication in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

Figure 1:
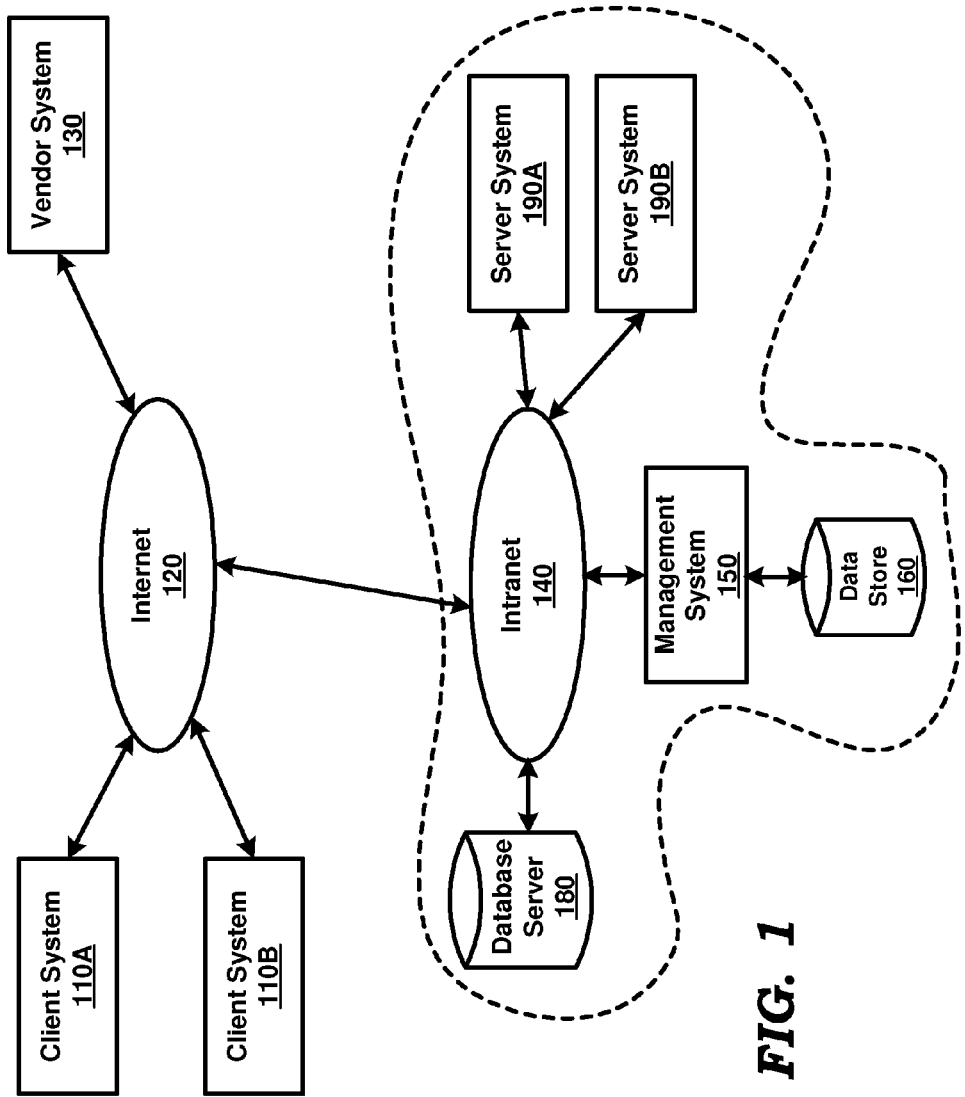
FIG. 1 is a block diagram illustrating an example environment (computing system) in which several features of the present invention can be implemented.

According to an aspect of the present invention, a management system facilitates deployment of customizations of an enterprise application, with the enterprise application containing software modules pre-installed on a set of servers. By using the management system, the deployment of customizations across an enterprise may be simplified.

In an embodiment, the management system first receives a set of deployment units each containing data defining a manner of configuration affecting the operation of at least some of the software modules to attain the desired customizations, and an enterprise profile indicating the specific subset of deployment units to be deployed in each of the servers. Management system then orchestrates the configuration of the software modules installed on the set of servers according to the data specified in the set of deployment units and the enterprise profile.

Thus, a user/developer desiring customization of an enterprise application is relieved from the task of deploying each of the individual customizations (deployment units) on each of the servers executing the enterprise application.

According to another aspect of the present invention, the management system examines a dependency data indicating the specific deployment units which need to be deployed prior to deployment of a deployment unit of interest and then performs configuration of the software modules based on the specific deployment units before performing configuration based on the deployment unit of interest.

Further, on receiving a level of parallelism specifying a specific number of deployment units (of the same/different type) that may be simultaneously deployed on the set of servers, the management system ensures that the maximum number of deployment units deployed simultaneously on the set of servers does not exceed the specific number of deployment units.

According to one more aspect of the present invention, the management system receives a data indicating that only the configuration caused by specific deployment units is to be activated. In response, the management system activates only the configurations caused by the specific deployment units.

In one embodiment, activation includes tasks such as clearing a cache in a database server (when a deployment unit causes data in the database server to be changed), restarting an application server or specific software modules (when a deployment unit causes a change in the operation of the specific software modules) and requiring a user to reconnect to a web server (when a deployment unit causes files to be copied the web server).

According to an aspect of the present invention, the management system stops the deployment of customizations of an enterprise application in response to receiving an indication to stop configuration. On receiving another indication for resuming configuration, the management system determines the deployment units which have not yet been used for configuring the software modules of the enterprise application. Management system then performs configuration of the software module using only the determined deployment units.

According to another aspect of the present invention, the management system receives a sequence of indications indicating corresponding stages of deployment, with each indication specifying a corresponding set of deployment units to be deployed on a corresponding set of servers. Management system then performs configuration on the set of servers using the corresponding set of deployment unit specified in a current stage only after configuration on the set of servers using the corresponding set of deployment units specified in a previous stage.

Such a staged deployment may be required in an example scenario in which the set of servers in the previous stage contains a database server with a corresponding deployment unit containing a data of interest to be deployed on the database server. Further, the set of servers in the current stage contains a server with a corresponding deployment unit providing customization of a software module executing in the server, with the software module requiring the data of interest in the database server for operation. Accordingly, the data of interest is copied to the database server in the previous stage before customization of the software module on the server is performed in the current stage.

According to yet another aspect of the present invention, a management system stores backup data specifying a corresponding state of an enterprise application deployed on each of a set of servers during orchestration. On receiving a request to rollback the deployment in a specific server, management system restores the enterprise application on the specific server using the backup data to cause the corresponding state to be restored. In one embodiment, the request indicates that the rollback is to be effected on only on a subset of servers and the management system restores the corresponding state only on the indicated subset of servers.

According to one more aspect of the present invention, a management system stores a backup data specifying a corresponding state of an enterprise application in a server prior to deployment of each of a set of deployment units. On receiving a request to rollback the deployment of a specific one of the set of deployment units, management system restores the enterprise application on the server using the backup data to cause the corresponding state prior to deployment of the specific deployment unit to be restored.

According to an aspect of the present invention, the management system receives a descriptor data indicating a type of each one of the set of deployment units and a management information indicating the manner of configuration of the software modules corresponding to each of the types. Management system then determines the corresponding type of each of a received set of deployment units and then performs the customization of the enterprise application according to the management information corresponding to the type of the deployment unit. In one embodiment, the type of a deployment unit is one of a file type, a database type, a repository type and a workflow type.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

FIG. 1 is a block diagram illustrating an example environment (computing system) in which several features of the present invention can be implemented. The block diagram is shown containing client systems 110A-110B, internet 120, vendor system 130, intranet 140, management system 150, data store 160, database server 180 and server systems 190A-190B.

Merely for illustration, only representative number/type of systems is shown in the Figure. Many environments often contain many more systems, both in number and type, depending on the purpose for which the environment is designed. Each system/device of FIG. 1 is described below in further detail.

Intranet 140 represents a network providing connectivity between server systems 190A-190B, database server 180 and management system 150, all provided within an enterprise (shown with dotted boundaries). Internet 120 extends the connectivity of the systems of the enterprise with external systems such as vendor system 130 and client systems 110A/110B. Each of intranet 140 and Internet 120 may be implemented using protocols such as Internet Protocol (IP) well known in the relevant arts.

Each of data store 160 and database server 180 facilitates storage and retrieval of a collection of data. Database server 180 stores data used (generated or stored) by enterprise applications (executing in server systems 190A-190B) in processing various client requests. Data store 160 facilitates management system 150 to store/retrieve local data such as backup data corresponding to one of database server 180 and/or server systems 190A-190B. In one embodiment, each of data store 160 and database server 180 is implemented using relational database technologies and therefore provides (persistent) storage and retrieval of data using structured queries such as SQL.

Each of client systems 110A-110B represents a system such as a personal computer, workstation, mobile station, etc., used by an end user (e.g., an executive in a call center serving various customers, not shown) to generate (client) requests to enterprise applications executing in server systems 190A-190B. The requests may be generated according to a suitable interface. In general, a client system requests an enterprise application for performing operations and receives corresponding responses containing the results of performance of the requested operations.

Vendor system 130 represents a server system facilitating vendors/providers (of the enterprise applications) to provide various deployment units used in customization of the enterprise applications (executing in server systems 190A-190B) according to various aspects of the present invention. Vendor system 130 may also provide management information indicating the manner in which customization of an enterprise application is to be performed using the deployment units.

Each of server systems 190A-190B represents a server, such as a web/application server, which executes enterprise applications (such as Siebel 8.0, a CRM application available from Oracle Corporation or Salesforce.com™, another CRM application available from Salesforce.com, Inc) capable of performing operations requested by client systems 110A-110B. A server system may perform the operations on data maintained internally or on external data (stored in database server 180) and then send the result of performance of the operations to the requesting client system.

As noted above, server systems 190A-190B, database server 180, and management system 150 (together with intranet 140 providing connectivity among the systems) may be implemented in a single "enterprise". As such, the combined systems (shown with the dotted boundary) may be executing an enterprise application, with the various software modules constituting the enterprise application being executed on the various systems such as server system 190A-190B and database server 180. It may be appreciated that in alternative embodiments, management system 150 (and/or data store 160) may be implemented external to such an "enterprise".

It may be desirable that an enterprise application installed in such an enterprise be customized as per the requirements of the enterprise. Such customization may involve modifying the configuration of the software modules executing on the server systems. The manner of configuration/customization may entail changing the data (used for performing operations) in both server systems and the database server, modifying workflows type data to control the sequence in which different portions/instructions contained in a software module is executed, changing the image/template files used in display interfaces provided by execution of instructions contained in the software modules, etc.

It may be appreciated that multiple instances of the same software module may be executed on multiple servers to facilitate load balancing, fault tolerance, etc. As such, modifying the configuration of a software module may necessitate that the deployment unit (specifying the modification) be deployed on the multiple servers executing the software module.

Further, it may be necessary that the configuration of software modules be performed in a pre-defined sequence (based on the manner in which the enterprise application is designed), for example, modification of the configuration of a software module may necessitate that a deployment unit containing the data required by the modification be deployed prior to a deployment unit specifying the modification.

In one prior approach, a vendor/developer developing a customization for a software module is required to manually deploy the customizations on the different instances of the software module executing on the servers (while manually ensuring that the customizations are performed in an appropriate sequence). Such an approach requires the vendor/developer to spend considerable amount of time and/or resources in deploying customizations of an enterprise application across the several servers present in the enterprise.

Management system 150 provided according to an aspect of the present invention facilitates deployment of customizations of an enterprise application executing on server systems 190A-190B and database server 180 as described below with examples.

3. Facilitating Deployment of Customizations of an Enterprise Application

Figure 2:
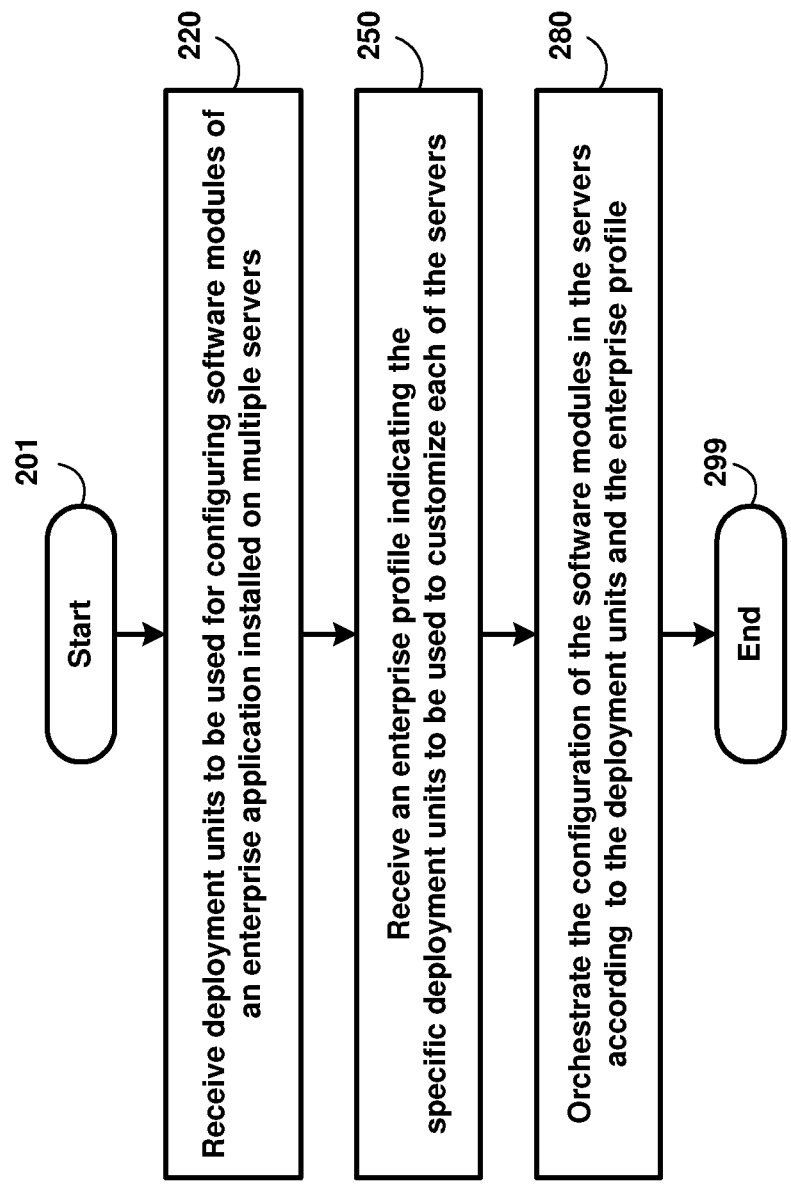
FIG. 2 is a flowchart illustrating the manner in which deployment of customizations of an enterprise application executing on multiple servers is facilitated according to an aspect of the present invention.

FIG. 2 is a flowchart illustrating the manner in which deployment of customizations of an enterprise application executing on multiple servers is facilitated according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 220.

In step 220, management system 150 receives deployment units to be used for configuring software modules of an enterprise application installed on multiple servers (such as server systems 190A-190B and database server 180). The deployment units may be received from vendor system 130 (for example, in the form of a deployment package) and may be provided by a vendor of the enterprise application.

A deployment unit may represent the smallest deployable entity, upon which the management system operates and may contain data (such as changes in software instructions, configuration values, image/template files, etc) defining a manner of configuration of at least some of the software modules of an enterprise application to attain one or more of the desired customizations. In an embodiment, management system 150 ensures that all or none of the configurations indicated by the data in a deployment unit are deployed and the content of the deployment units may be accordingly designed.

In step 250, management system 150 receives an enterprise profile indicating the specific deployment units to be used to customize the specific ones of the servers. The enterprise profile may be specified by an administrator using an appropriate interface provided by management system 150. Alternatively, the enterprise profile may be received from vendor system 130 and may be provided by the vendor of the enterprise application based on the details (e.g., the specific systems present, connectivity information, etc.) of the enterprise.

In step 280, management system 150 orchestrates the configuration of the software modules in the servers according to the deployment units and the enterprise profile. The orchestration may entail determining when to deploy which deployment units on each server, and performing the deployment according to the determination. The flow chart ends in step 299.

Thus, an administrator may control the customization sequence/timing by including the appropriate content in the enterprise profile. The manner in orchestration provides such enhanced control in an example embodiment is described below.

4. Orchestrating Deployment on Multiple Servers

Figure 3:
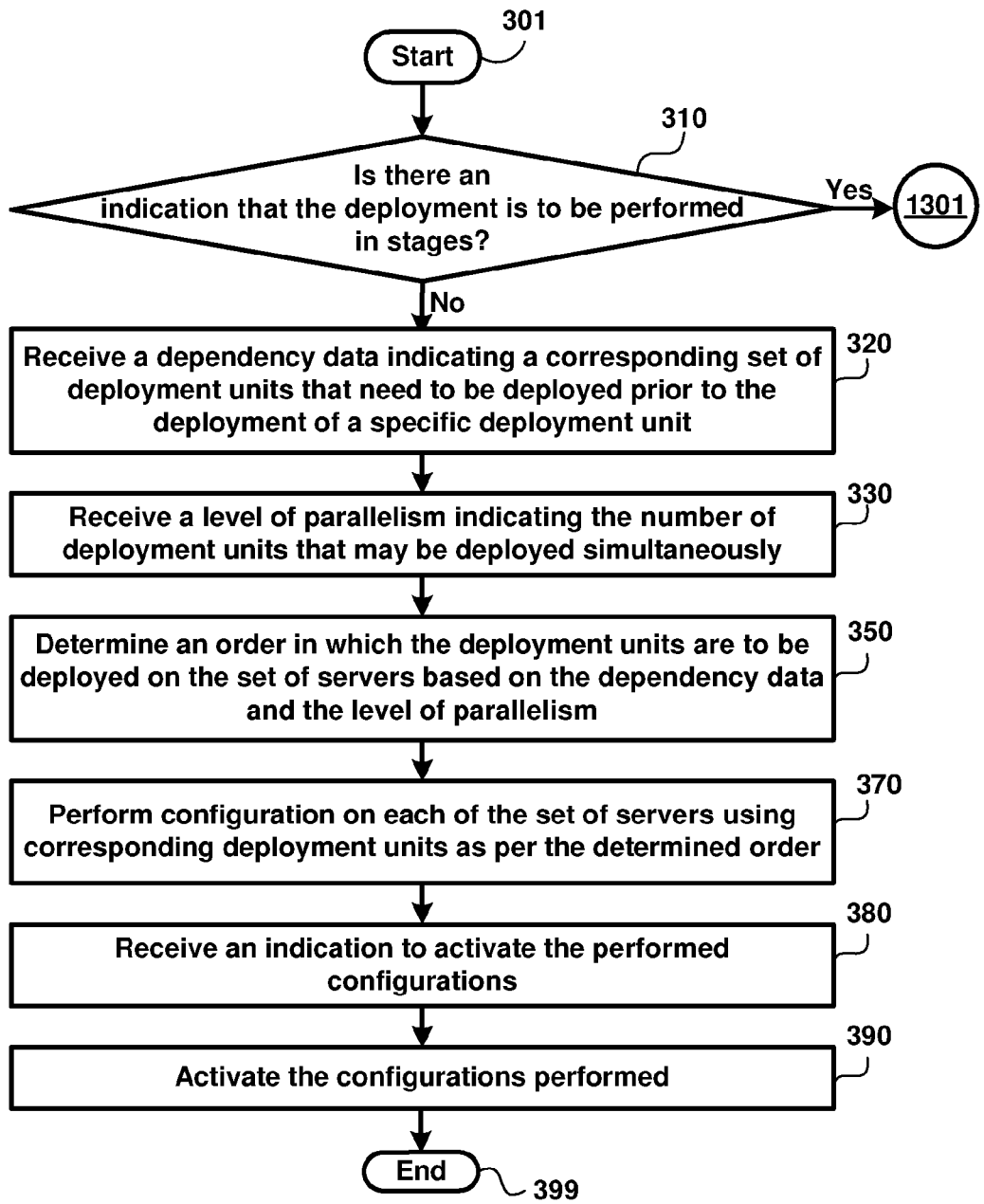
FIG. 3 is a flowchart illustrating the manner in which deployment of deployment units is orchestrated according to an aspect of the present invention.

FIG. 3 is a flowchart illustrating the manner in which deployment of deployment units is orchestrated according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 301, in which control immediately passes to step 310.

In step 310, management system 150 determines whether there is there an indication that the deployment is to be performed in stages. The indication may be received from a command line interface (CLI), for example, as a parameter entered when the user initiates execution of a program that starts deployment of the deployment units. Control passes to step 1301 in the flowchart of FIG. 13 if there is such an indication and to step 320 otherwise.

In step 320, management system 150 receives dependency data indicating a corresponding set of deployment units that need to be deployed prior to the deployment of a specific deployment unit. Thus, each such requirement represents a constraint on the order or sequence in which the deployment units can be deployed. The dependencies may be due to the technical operation of the software modules or even for administrative reasons (as described in sections below with examples).

In step 330, management system 150 receives a level of parallelism indicating the number of deployment units that may be deployed simultaneously. The level of parallelism may specify any desired constraints such as the number of servers on which a deployment unit can be deployed in parallel, the number of deployment units that can be deployed in parallel on each server, the total number of deployment units that can be deployed simultaneously during orchestration, etc. The level of parallelism may also be specified as different values corresponding to different categories of the deployment units.

In one embodiment, the dependency data and the level of parallelism is specified in the enterprise profile noted above. As such, an administrator may control the orchestration by including the appropriate content/values for the dependency data and the level of parallelism in the enterprise profile.

In step 350, management system 150 determines an order in which the deployment units are to be deployed on the set of servers based on the dependency data and the level of parallelism. Various approaches, well known in the relevant arts, can be used in determining the specific order of deployment. In an embodiment described below, the order is specified in terms of a sequence of sets, with each set indicating the specific deployment units that can be deployed in corresponding servers in parallel.

In step 370, management system 150 performs configuration on each of the set of servers using corresponding deployment units as per the determined order. In an embodiment, configuration entails copying the data (e.g., the content of a file or a file itself) to the appropriate locations. The manner, in which the configuration may be performed on each server system in an example embodiment, is described below with respect to FIG. 4.

In step 380, management system 150 receives an indication to activate the performed configurations. Such an indication may be received in one of various ways, for example, as a parameter in a command invoking the deployment, as a separate command (using a CLI), and specifically to each deployment unit type, etc. Activation refers to making the previously performed configuration effective in the configured enterprise application In step 390, management system 150 activates the configurations performed on the set of servers. The specific actions required for activation depend on the type of the deployment unit (which indicates the entity configured), and may be indicated by the management information. For example, in case of database servers operating with a cache, it may be necessary that the cache be cleared of the old data, thereby enabling the new data (copied during configuration) to be operative (e.g., loaded into the cache or otherwise used). Some other features may require re-initialization of the specific software module. The flowchart ends in step 399.

Though not shown in FIGS. 2 and 3, it may be appreciated that management system 150 may verify that the desired customizations are attained in view of the configurations performed above. Such verification may be performed by inspecting the log files, executing test scripts, etc. Management system 150 may also perform tasks such as recovery in the appropriate scenarios. The results/status of all such deployment (including configuration, activation, verification and recovery, etc.) may be provided to a user/administrator in an appropriate format (for example, as reports in a reporting server, not shown).

Thus, management system 150 facilitates deployment of the various customizations of an enterprise application executing on multiple servers. The description is continued illustrating the manner in which customizations of an enterprise application are deployed in a single server.

5. Deploying Customizations on a Single Server

Figure 4:
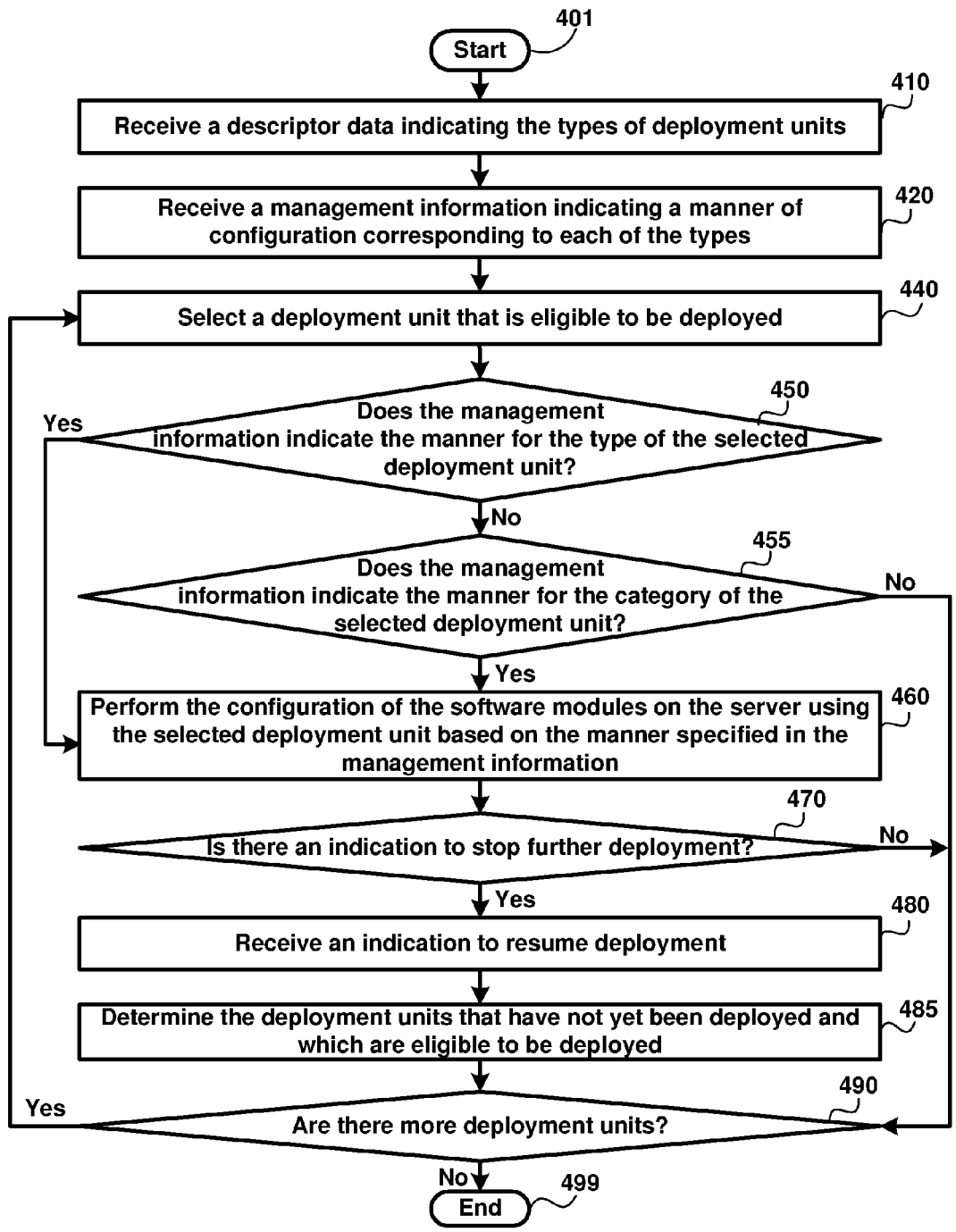
FIG. 4 is a flowchart illustrating the manner in which customizations of an enterprise application are deployed on a single server according to an aspect of the present invention.

FIG. 4 is a flowchart illustrating the manner in which customizations of an enterprise application are deployed on a single server according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 401, in which control immediately passes to step 410.

In step 410, management system 150 receives a descriptor data indicating the types of deployment units which are available for configuring software modules of an enterprise application installed on a server (such as server systems 190A-190B or database server 180). The descriptor data may be received from vendor system 130 and may be provided by a vendor providing the deployment units. In one embodiment, the descriptor data is included in a deployment package (containing the deployment units) received from vendor system 130.

In step 420, management system 150 receives a management information indicating a manner of configuration (of the software modules) corresponding to each of the types of the deployment units. The manner may indicate the specific actions to be performed as well as any additional information required associated with performance of the actions. Thus, by providing the information for each of the deployment unit 'types', the actions to be performed with respect to each deployment unit are specified without duplication. The configuration of the software modules may cause one or more of the customizations of the enterprise application to be attained.

The management information may be received from vendor system 130 and may be provided by the vendor of the enterprise application. Management system 150 may store a copy of the received management information in data store 160, and as such may not require the management information to be received again during subsequent deployments.

In step 440, management system 150 selects a deployment unit that is now eligible to be deployed from the deployment units consistent with the order determination of step 350. It may be appreciated that multiple deployment units may be eligible. In such a scenario, a flag may be maintained associated with each of the multiple eligible deployment units (in data store 160) that have to be deployed on the server.

The flag may indicate whether the corresponding deployment unit has been deployed in the server (value "completed") or has not been deployed (value "pending"). Management system 150 then scans the flags of eligible deployment units and determines a deployment unit having a corresponding flag value of "pending" as the selected deployment unit.

In step 450, management system 150 determines whether the management information indicates the manner of configuration for the type of selected deployment unit. That is, the management information is examined to check whether the manner of configuration is present for the type of the particular deployment unit. Control passes to step 460 if the management information indicates the manner corresponding to the type and to step 455 otherwise.

In step 455, management system 150 determines whether the management information indicates the manner of configuration for the category of the selected deployment unit. Category refers to a set of types (of deployment units) grouped for convenience. The grouping may be based on any criteria, as suited in the specific deployment environment. For example, deployment units containing image/template files having corresponding "Web" and "Report" types may be grouped together under a "File" category for convenience. Control passes to step 460 if the management information indicates the manner corresponding to the category and to step 490 otherwise.

It may be observed that steps 450 and 455 operate to provide higher priority to the manner of configuration indicated for the type of the particular deployment unit compared to a general manner indicated for the corresponding category. It may be appreciated that the category of a deployment unit represents the (general) type of the deployment unit and as such deployment units of a specific category (such as "File") are often referred to as being of the type of the specific category (that is, "File" type).

Further, it may be appreciated that in a scenario that the management information does not specify the manner corresponding to the type and the category of a specific deployment unit, the specific unit may not be deployed. In one embodiment, management system 150 validates that the type/category of each of the deployment units (available for deployment) is specified in the management information before deployment is commenced.

In step 460, management system 150 performs the configuration of the software modules using the (selected) deployment unit based on the manner specified in the management information. The manner may correspond to either the manner associated with the type of the selected particular deployment unit (determined in step 450) or the manner associated with the category of the selected deployment unit (determined in step 455).

In step 470, management system 150 determines whether there is an indication to stop further deployment. For example, management system 150 may stop deployment when an error is encountered during configuration using a selected deployment unit in response to, for example, an option indicated in an enterprise profile or as a parameter when initiating deployment of the deployment units.

In another embodiment, the administrator initiates batch deployment of the deployments for a server using a command line interface (CLI), and control is transferred back to the user while the deployment units are being deployed. The administrator may use the CLI at any time instance to indicate that the deployment is to be stopped. Management system 150 then stops deployment after completion of using a presently selected deployment unit. Control passes to step 480 if there is such a stop indication and to step 490 otherwise.

In step 480, management system 150 receives an indication to resume deployment. Such an indication may be received from an administrator using CLI (e.g., in the form of a command according to a pre-specified convention).

In step 485, management system 150 determines the deployment units that have not yet been deployed and which are eligible to be deployed consistent with the order determination of step 350. In the example scenario described above, all the eligible deployment units having a flag value of 'pending' may be determined for further deployment.

In step 490, management system 150 determines whether there are more deployment units to deploy. In the example scenario described above, the value of the flag associated with the selected deployment unit is updated to value "Completed" in step 460 (if the deployment is performed without errors) and the determination of step 485 is performed by scanning the flags of all the eligible deployment units (with the existence of at least one "pending" flag indicating that there are more deployment units to deploy). In a scenario that all the flags have value "completed", control is passed to step 499 and to step 440 otherwise.

Thus, management system 150 deploys customizations of an enterprise application on a single server. The manner in which customizations of an enterprise application are deployed on one or more servers is described below with examples.

6. Example Illustrating Deployment of Customizations

FIGS. 5, 6, 7, 8, 9 and 10 together illustrate the manner in which customizations of an enterprise application (executing on multiple servers) are deployed in one embodiment. Each of the Figures is described in detail below.

Figure 5:
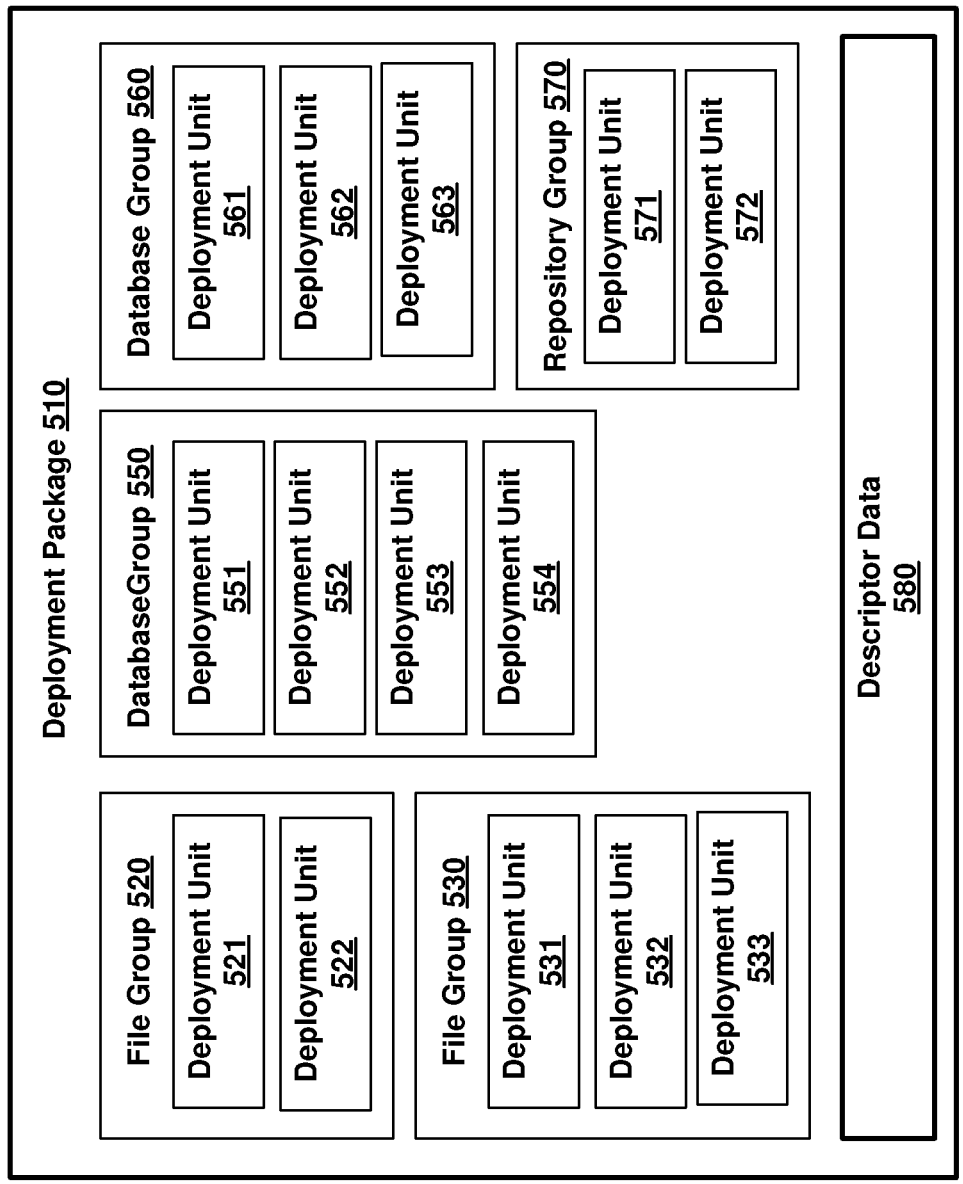
FIG. 5 is a block diagram of a deployment package (containing deployment units and descriptor data) used for customizing an enterprise application in one embodiment.

Broadly, management system 150 facilitates customizations of an enterprise application executing on multiple servers by the deployment of an appropriate set of deployment units. In one embodiment, management system 150 receives the set of deployment units in the form of a deployment package (FIG. 5). The deployment package includes a descriptor data (FIG. 7) identifying the types (and categories) of each of the set of deployment units.

Management system 150 also receives a management information (FIG. 8) indicating the manner in which software modules (constituting the enterprise application) are to be configured corresponding to each of the types of the deployment units. Further, management system 150 receives an enterprise profile (FIG. 9) indicating the specific deployment units to be used to customize each of the servers Management system 150 then determines an order (FIG. 10) in which the deployment units are to be deployed on the multiple servers (executing the enterprise application) based on the information (such as dependency data, level of parallelism, deployment level etc.) contained in the received enterprise profile.

Management system 150 then performs the deployment of the deployment units on each server (as per the determined order) based on the received descriptor data and the management information. The manner in which deployment is performed is based on the type of the deployment unit being deployed and described in below sections.

The description is continued describing a deployment package (containing the deployment units and the descriptor data) used for customizing an enterprise application in one embodiment.

7. Deployment Package

FIG. 5 is a block diagram of a deployment package (containing deployment units and descriptor data) used for customizing an enterprise application in one embodiment. Each of the blocks in the Figure is described in detail below.

Deployment package 510 represents a compressed/archive file containing the various deployment units to be used for customizing an enterprise application. Deployment package 510 may be provided by a vendor of the enterprise application (from vendor system 130).

Various types of deployment units may be provided based on the customizations to be attained in the enterprise application. In one embodiment, the types of deployment units are grouped as categories/types entitled a "database", a "repository", a "file" and a "workflow" (not shown), which are described in further detail below.

File group 520 represents a group of deployment units (521 and 522) of type "File". Grouping of deployment units enables deployment to be performed at a group transaction level that is management system 150 ensures that all or none of the deployment units in a group are deployed. In one embodiment, each of the groups is implemented as a folder (named with the corresponding category/type) containing the files representing the corresponding deployment units.

Similarly, file group 530 represents another group of deployment units (531-533) of type "File", database groups 550 and 560 respectively represents groups of deployment units (551-554 and 561-563) of type "database", and repository group 570 represents a group of deployment units (571-572) of type "repository".

Each of deployment units 521-522, 531-533, 551-554, 561-563 and 571-572 represents a file containing data defining the manner of configuration of some of the software modules (of an enterprise application) to attain or one or more customizations. The data contained in a deployment unit depends on the type of the deployment unit as described in detail below.

A deployment unit of "file" type (such as deployment unit 521) is a data file containing binary and/or text data, for example, image files or template files. During deployment, the data file is copied to a location/folder specified in the management information (corresponding to the "File" type or the specific deployment unit).

A deployment unit of "workflow" type (not shown in the Figure) is a file containing workflow data which is to be provided as an input to an installation module (specified in the management information) designed to cause customization of the enterprise application based on the workflow data. During deployment, management system 150 may remotely invoke the installation module (executing on a server) with the workflow data to cause customization to be performed.

A deployment unit of "database" type (such as deployment unit 551) is a database input file containing data corresponding to rows to be written into a database (for example, in database server 180). Such database type deployment units typically contain runtime customizations like addition of Access Groups (enabling users using client systems 110A-110B to access specific services), addition of LOVs (list of values), and change in Web Services etc.

FIGS. 6A and 6B together depict a portion of a database input file (a deployment unit of "Database" type) containing data corresponding to rows to be written to a database during deployment in one embodiment.

Line 601 (tag "<?xml>") indicates that the content is encoded in the form of XML. Lines 602-666 (between tags "<SiebelMessage>" and "</SiebelMessage>") depict the data corresponding to rows to be written to a database during deployment. In particular, line 605 (tag "<ExportFilePath/>") indicates the database from which the data was exported and line 611 (tag "<DataTypeName/>") indicates the type of the exported data. Further, lines 617-631 and 634-660 (between tags "<_und_undPROPERTIES_und_und>" and "</_und_undPROPERTIES_und_und>") specify the data contained in corresponding columns of specific rows in the exported data and which are to be written (inserted or updated) in the database.

It may be appreciated that though the content of FIGS. 6A-6B, 7, 8A-8C, 9A-9B and 16B is shown encoded in extensible markup language (XML) according to one convention, other encoding/formats and conventions may be used for representing the same/similar data.

A deployment unit of "repository" type (such as deployment unit 571) is a repository file containing data indicating repository objects (typically rows of a table similar to "database" type) to be written to a database (for example, in database server 180). During deployment, the data contained in the deployment units of "database" and "repository" type are inserted (or used to update) into databases in the corresponding database servers (as specified by the management information and the enterprise profile).

Descriptor data 580 represent a file containing data indicating the structure of deployment package 510 such as the deployment units, the groups of deployment units, the type of each deployment unit etc. as described in detail below.

8. Descriptor Data

FIG. 7 depicts a portion of a descriptor data indicating the types of deployment units used for customizing an enterprise application in one embodiment. The description is continued assuming that the descriptor data is received in deployment package 510 (corresponding to descriptor data 580) and as such specifies information about the structure and the various deployment units contained in deployment package 510.

Line 721 (tag "<?xml>") indicates that the descriptor data is encoded in the form of XML. Lines 722-748 (between tags "<ADMPackage>" and "</ADMPackage>") depict the details of a deployment package (such as deployment package 510) created on "2006-05-05 14:05:42" with description "Package descriptor file created by ADM Packager" (as indicated by the corresponding attributes in lines 722 and 723).

The value of "Rolling server restart" for the attribute "SystemImpact" in line 723 indicates that the various servers (on which the deployment package is deployed) may be restarted in a pre-defined sequence after customization is complete, thereby ensuring that the down time of the enterprise application is minimized.

Lines 724-727 (between tags "<Group>" and "</Group>") depicts a group of deployment units of category "File" named "File Group—Reports—Application Server" (as indicated by corresponding attributes in line 724) and may correspond to file group 520.

In particular, line 725 (tag "<DeploymentUnit/>") specifies a deployment unit, the data of which is located at "file/AppServer/reports/ENU/aclist1.rox". Further, the deployment unit is depicted associated with a deployment type "Reports—Application Server" (the value of the attribute "DeploymentType") different from the "File" category to which the deployment unit belongs. As such deployment of the deployment unit may be performed based on the manner of configuration (indicated in the management information as described in below sections) corresponding to either the type or the category of the deployment unit.

Similarly, lines 728-732 depict another group of deployment units of category "File" having a name "File Group—Webmaster", with each deployment unit being of the deployment type "Webmaster". It may be observed that the deployment units contain image files such as "image_1.gif", "image_2.gif" etc. and may correspond to file group 530.

Lines 733-738 depict a group of deployment units of category "Database" named "Database Group—Responsibility". In particular, line 734 specifies a deployment unit of type "Responsibility" containing a database input file named "database/42H4V_Resp.xml" (which may contain data shown in FIGS. 6A and 6B) and a descriptor file "database/42H4V_Resp_des.xml" indicating the structure of the data. The group of deployment units may correspond to database group 550.

Similarly, lines 739-743 depict another group of deployment units of category "Database" having a name "Database Group—Business Rule", with each deployment unit being of the deployment type "Business Rule" and may correspond to database group 560.

Lines 744-747 depict a group of deployment units of category "Repository" named "Repository Group" and may correspond to repository group 570. Each deployment unit is shown containing a repository ".sif" file containing the repository objects and a corresponding descriptor ".xml" files indicating the structure of the repository objects. It may be observed that the deployment units depicted in lines 745 and 746 have different types "Business Component" and "Business Service" respectively.

Thus, management system 150 receives a deployment package (510) containing the deployment units (files) and a descriptor data (described above) indicating the (categories and) types of the deployment units contained in the deployment package. The deployment package may be generated using appropriate tools at vendor system 130.

Management system 150 then receives a management information (from vendor system 130) indicating the manner of configuration of the software modules corresponding to the types of the received deployment units. The description is continued describing the details of such a management information in one embodiment.

9. Management Information

FIGS. 8A, 8B and 8C together depicts a portion of a management information indicating a manner of configuration of the software modules (constituting an enterprise application) corresponding to the types of deployment units in one embodiment. The management information may be received from vendor system 130 and may then be maintained in data store 160 (by management system 150). The maintenance of the management information may be performed independently of the deployment of the customizations.

Line 801 (tag "<?xml>") indicates that the management information is encoded in the form of XML. Lines 802-895 (between tags "<adm_registry>" and "</adm_registry>") depict the details of a management information with version "1.0".

Lines 803-831 (between tags "<deployment category>" and "</deployment category>") depicts the manner of configuration for deployment units of category "Database" (as indicated by the attribute "name" in line 803). Line 804 (between tags "<deployment_level>" and "</deployment_level>") indicates the transaction level for the "Database" category, with the value "Unit" indicating that all or none of the configuration (changes) defined in a deployment unit are to be deployed.

Line 805 (between tags "<mbean>" and "</mbean>") specifies the software component "ADMDataMBean" to be used for configuration of the software modules. Such software components may be provided in the servers executing the enterprise application and may be designed to work in sync with management system 150. The software components may also be designed to configure specific software modules executing on a server and are described in detail in below sections.

Lines 806-810 (between tags "<validation_rules>" and "</validation_rules>") indicates the validations to be performed before deployment of the deployment unit. In particular, line 808 indicates that the status of the software component "ADMObjMgr" is to be verified to be one of "Online" and "Running".

Lines 811-819 (between tags "<default_operations>" and "</default_operations>") specify the default operations to be performed for each deployment unit of category "Database". Each operation specifies the name of a method/service to be invoked in the software component (for example "ADMData-MBean") deployed on the corresponding server. It may be observed (in line 814) that validation rules specific to each operation may also be specified.

Lines 820-828 (between tags "<deployment_type>" and "</deployment_type>") specify the operations to be performed for each deployment unit having the deployment type "Business Rule" (as indicated by the "name" attribute in line 820). The value "No impact" of the attribute "system impact" in line 820 indicates that the deployment of the specific deployment unit does not require any further actions to be performed (such as restarting the server, clearing the database cache etc.)

Line 822 (tag "<operation/>") specifies that a "Backup" operation is to be performed by invoking the service named "Rule Runtime Administration" and the method named "Backup" (as indicated by the respective attributes "service_name" and "method_name"). Similarly each of lines 823-826 specifies other operations specific to the deployment type "Business Rule".

As such the operations specified corresponding to the type of the deployment unit (in lines 822-826) are given higher priority to the default operations specified corresponding to the category "Database" of the deployment unit (in lines 811-819) and are used to deploy deployment units of type "Business Rule".

Lines 829 and 830 specify other deployment types "Correspondence template" and "Responsibility" with no specific operations indicating that the default operations are to be performed for deployment of the corresponding deployment units.

Lines 832-872 depict the manner of configuration for deployment units of type/category "File" (as indicated by the attribute "name" in line 832) with a transaction level of "Group" (shown in line 833) indicating all or none of the configuration (changes) defined in a group of deployment units are to be deployed. Further the software component is identified as "ADMFileMBean" in line 834 and the default operations to be performed are specified in lines 835-841.

Lines 842-848 specify the specific operations and/or the parameters to be used in performing the default/specific operations corresponding to the deployment type "Reports—Application Server" (as indicated by the "name" attribute).

In particular line 844 (tag "<parameter/>") indicates that the parameter named "TargetServerType" has a corresponding value of "AppServer", that is, the type of the target server on which the deployment units are to be deployed be an application server. In line 845 the destination directory (the location to which the files are to be copied) is indicated to be "reports/%LANG%" (where "%LANG%" is a pre-defined keyword representing the installation language and whose value is substituted during deployment) and in line 846, the valid file extensions that are to be copied are indicated to be "rox" and "txt".

Lines 849-855 and lines 856-871 depict information corresponding to other deployment types "SRF" and "Webmaster" respectively. It may be observed that operations specific to the deployment type "Webmaster" are specified in lines 862-870 indicating that the specific operations are to be performed instead of the default operations during deployment of corresponding deployment units.

It may be further observed that system impact of the deployment type "Webmaster" is indicated as "User reconnect" (in line 856) indicating that the impact of the configuration changes made will not be available until a user reconnects with the system/server.

Lines 873-894 depict the manner of configuration for deployment units of type/category "Repository" (as indicated by the attribute "name" in line 873) having a transaction level of "Unit" (shown in line 874), with the software component identified as "ADMDataMBean" (shown in line 875) and the default operations to be performed specified in lines 881-887. Lines 888-893 specify the specific operations to be performed for deployment units having the deployment type "Workflow Process".

It may be appreciated that management system 150 on receiving the descriptor data shown in FIG. 7, inspects the management information (depicted in FIG. 8) and performs the deployment based on the manner of configuration indicated in the management information corresponding to the type of the deployment unit or the specific deployment unit.

Accordingly, management system 150 deploys the group of deployment units specified in lines 724-727 (with deployment type "Reports—Application Server") using the default operations specified in lines 835-841 using the parameters specified in lines 843-847. As such, the files/deployment units in the group are copied to the destination directory "reports/enu" (assuming that the installation language is English as indicated by "enu") in the target servers.

Similarly, the group of deployment units specified in lines 728-732 (with deployment type "Webmaster") is deployed using the specific operations specified in lines 862-870 with the parameters specified in lines 857-861, that is, the files/deployment units are copied to the destination directory "webmaster" in the target servers.

Management system 150 deploys the deployment units specified in lines 733-738 by performing the default operations specified in lines 811-819 corresponding to the category "Database" (as there are no specific operations specified for the deployment type "Responsibility" in line 830). On the other hand, the deployment units specified in lines 739-743 are deployed using the specific operations specified in lines 821-827 corresponding to the deployment type "Business Rule".

It may be observed that the deployment types "Business Component" and "Business Service" of the deployment units defined in lines 744-747 are not included in the management information. As such, management system 150 may deploy such deployment units using the default operations specified in lines 881-887 corresponding to the category "Repository".

Thus, management system 150 performs the deployment of customization of an enterprise application on a single server using the management information (depicted in FIG. 8), the descriptor data (depicted in FIG. 7) and the corresponding deployment units. As described above, the above approach may be extended to multiple servers based on the information in the enterprise profile. Accordingly, the description is continued describing the details of an enterprise profile in one embodiment.

10. Enterprise Profile

FIGS. 9A and 9B together depicts a portion of an enterprise profile indicating the specific deployment units to be used to customize an enterprise application on each of the servers executing the enterprise application in one embodiment. The enterprise profile is described assuming that an enterprise application "Siebel" is to be customized based on the specific requirements of an enterprise "ACME".

Line 911 (tag "<?xml>") indicates that the enterprise profile is encoded in the form of XML. Lines 912-988 (between tags "<EnterpriseProfile>" and "</EnterpriseProfile>") depict the details of an enterprise profile named "Siebel Profile" for the enterprise named "ACME" for a corresponding enterprise application (named "Siebel") whose status is "Active" (as indicated by the respective attributes "Name", "EnterpriseName" and "Status" in line 912).

Lines 913-920 (between tags "<EnterpriseTargetServerInformation>" and "</EnterpriseTargetServerInformation>") specify the information about the various servers on which the enterprise application "Siebel" is being executed in the enterprise "ACME". In particular, line 914 (tag "<ServerInfo/>") specifies a server having an agent with a unique name "server1" and which can be accessed (by management system 150) using the connection string "acme://server1: 2321/siebel/ADMObjMgr_enu" (in the case of database/repository servers) with the enterprise application being installed in the directory "M:\siebel".

Agents represent software programs (installed on and) executing in each server on which customizations are sought to be deployed. The agents may be installed external to the enterprise application or may be installed as a software module constituting the enterprise application sought to be customized.

An agent executing on a server receives (in a pre-specified manner) the deployment units to be deployed on the server from management system 150 and then deploys the received deployment units on the server to cause customization of the enterprise application. In one embodiment, each agent provides a run time environment in which software components such as "ADMFileMBean", "ADMDataMBean" (described above) are executed to cause deployment of the corresponding deployment types (as indicated in the management information).

Thus, multiple servers may be selected (for customization) by specifying the unique names of the corresponding agents installed on the multiple servers. As such, lines 915-919 respectively specify other servers existing in the enterprise which are executing (one or more of the software modules contained in) the enterprise application. It may be appreciated that "server1" "server2" and "server3" may respectively correspond to database server 180, and server systems 190A and 190B.

Lines 921-927 (between tags "<Params>" and "</Params>") specify various parameters to be used during deployment of customizations of the enterprise application. In particular, line 922 (tag "<StopOnErrors/>") indicates that the customization is to be stopped on any errors encountered during deployment (as indicated by the value "Yes").

Similarly, lines 923 and 924 respectively indicate that validations are not to be performed and that backup operation is to be performed during deployment. Lines 925 and 926 specify authentication information ("UserName" and "Password") to be used for accessing a report server used for generating reports corresponding to the deployment of the customizations of the enterprise application.

Lines 928-963 indicate specific information for deployment of deployment units of category "File" (as indicated by the attribute "Name" in line 928). Lines 929-934 (between tags "<DeployServerList>" and "</DeployServerList>") specify the servers on which "File" deployment units are to be deployed.

In particular, line 930 (tag "<DeployServer/>") indicates the name of the agent "server1" (and thereby the corresponding server) to which the deployment units are to be deployed. Similarly lines 931-933 respectively specify the names of other agents (and corresponding servers) to which the deployment units of type/category "File" are to be deployed.

Lines 935-937 specify various parameters to be used during deployment. Line 936 (tag "<DegParallelism/>") specifies the level of parallelism indicating the number (value "2") of deployment units/groups of type "File" that may be deployed simultaneously during deployment. It may be appreciated that the level of parallelism along with the deployment level (specified in the management information) of "Group" for the deployment type "File" indicates that "2" deployment groups may be deployed in parallel (on one or more servers).

Lines 938-948 (between tags "<DeploymentType>" and "</DeploymentType>") indicate specific information to be used during deployment of deployment units having the deployment type "SRF" (as indicated by the "Name" attribute). Lines 939-942 specify the servers on which such deployment units are to be deployed and lines 943-947 specify the parameters to be used during the deployment of such deployment units.

It may be observed that the parameter in line 945 specifies a backup directory "\\sdchs20n270\upload" indicating the location to which the backup data is to be written prior to or during deployment. Lines 949-962 specifies information specific to another deployment type "Webmaster".

Lines 964-973 indicate specific information to be used during deployment of deployment units of category "Database". In particular, line 970 specifies that the degree/level of parallelism is "2" which along with the deployment level specified in the management information indicates that only "2" deployment units of "Database" category may be deployed in parallel.

Lines 974-987 indicate specific information to be used during deployment of deployment units of category "Repository". It may be observed that the level of parallelism is specified as "1" (in line 985) indicating that the category "Repository" does not support parallel deployment since the deployment units may have overlapping repository objects and may be required to be deployed in a pre-defined sequence serially.

Further, lines 975-978 (between tags "<Dependencies>" and "</Dependencies>") specify the dependency data indicating the indicating a corresponding set of deployment units that need to be deployed prior to the deployment of a deployment unit of type "Repository". In particular, lines 976 and 977 (tag "<Dependency/>") respectively indicate that all the deployment units of respective type/category "Database" and "File" are to be deployed with a status of "DEPLOYMENT_ COMPLETE" and "MIGRATION_COMPLETE" prior to deployment of any deployment unit of type "Repository".

Thus, it may be appreciated that different types of deployment units may be required to be deployed on the same server and the same deployment unit may be required to be deployed on different servers based on the dependency data and the level of parallelism (along with the deployment level). As such, management system 150 on receiving the enterprise profile (described above) first determines an order of deployment based on the above information as described below with examples.

11. Determining Order of Deployment

The description is continued assuming that the deployment units in deployment package 510 are to be deployed on servers "server1", "server2" and "server3" (hereafter referred to as S1, S2 and S3 respectively). File groups 520 and 530 are referred to as G1 and G3, while database groups 550 and 560 are referred to as G2 (containing units U1-U4 corresponding to deployment units 551-554) and G4 (containing units U1-U3 corresponding to deployment units 561-563), and repository group 570 is referred to as G5 (containing units U1-U2 corresponding to deployment units 571-572).

Thus, with reference to the management information depicted in FIG. 8, it may be observed that G1 and G3 ("File" type) are to be deployed as groups (deployment level being specified as "Group" in line 833), while G2, G4 ("Database" type) and G5 ("Repository" type) are to be deployed as units (corresponding to the deployment level being specified as "Unit" in lines 804 and 874 respectively).

With reference to the enterprise profile depicted in FIG. 9, the level of parallelism for "File" type is specified to be "2" (in line 936) indicating that two file groups may be deployed simultaneously and the level of parallelism for "Database" type is specified to be "2" (in line 970) indicating that two database units may be deployed simultaneously. The level of parallelism for "Repository" type is specified to be "1" (in line 985) indicating that only one unit is to be deployed in parallel.

Further, the dependency data in lines 975-978 indicates that "Repository" type units are to be deployed after the successful deployment of the deployment units of type "Database" and "File". The enterprise profile also specifies that the file groups G1 and G3 are to be deployed on the servers S1, S2 and S3 (assuming default server list specified in lines 929-934), the database groups G2 and G4 are to be deployed on server S1 only (lines 765-767) and the repository group G5 is to be deployed on server S2 only (lines 779-781).

Management system 150 based on the above information determines an order of deployment as illustrated below with examples.

12. Example Illustrating Order Determination

Figure 10:
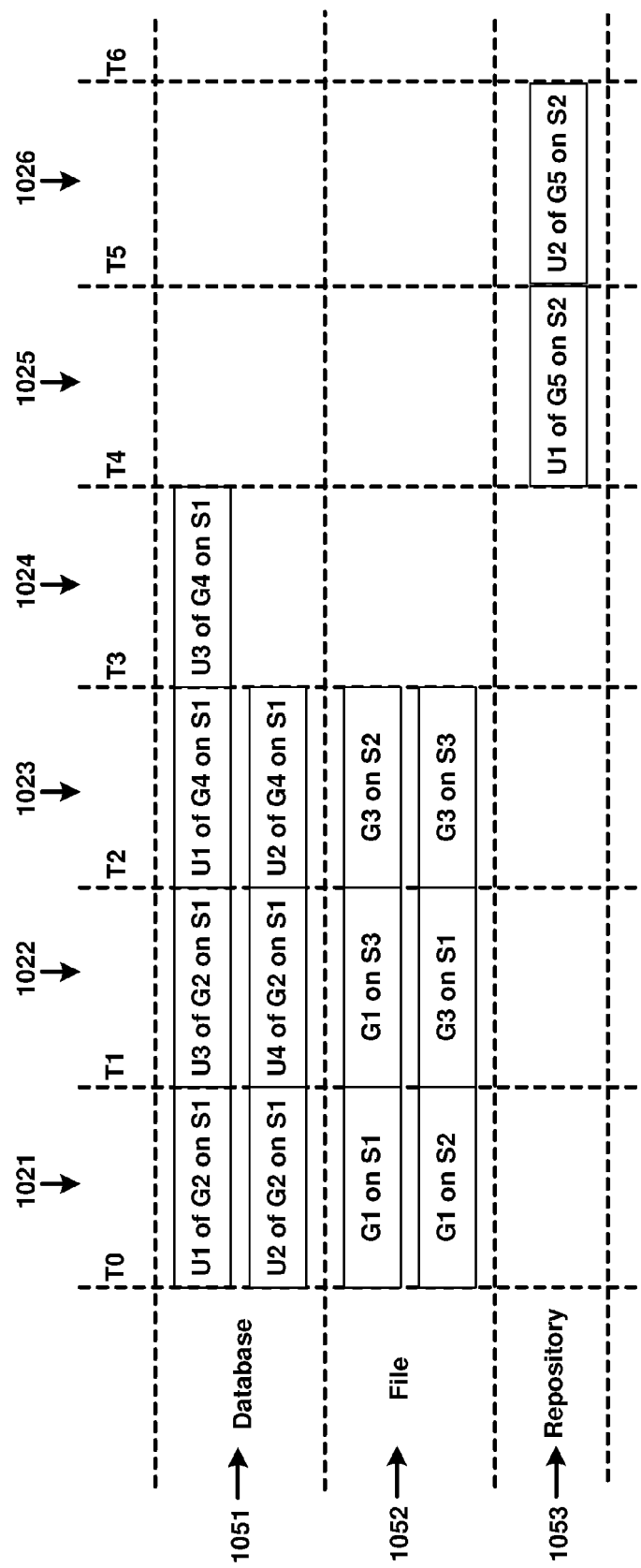
FIG. 10 depicts an order of deployment determined based on the dependency data, level of parallelism, and deployment level (specified in the enterprise profile and the management information) in one embodiment.

FIG. 10 depicts an order of deployment determined (as described above) based on the dependency data, level of parallelism, and deployment level (specified in the enterprise profile and the management information of above) in one embodiment.

The order of deployment is depicted as a table with each of rows 1051-1053 representing a deployment type/category and each of columns 1021-1026 representing a time period during which deployment is sought to be performed (with each of T0-T6 representing a time instant).

Thus, column 1021 indicates that the deployment units U1 and U2 contained in G2 (a database group) are to be deployed on server S1 (level of parallelism=2) and that the file group G1 is to be deployed on servers S1 and S2 (level of parallelism=2) during the time period between T0 and T1.

Similarly, column 1022 indicates that the deployment units U3 and U4 contained in G2 are deployed in S1 (thereby completing deployment of G2) and that the file group G1 is to be deployed on server S3 during the time period between T1 and T2. Since the deployment of G1 is complete, the next groups G3 is also simultaneously deployed on server S1 between T1 and T2 (consistent with the constraint described above).

Similarly, the units U1-U3 of database group G4 are deployed on server S1 and the file group G3 is deployed on servers S2 and S3 during the time period between T2 and T4 as depicted in columns 1023-1024.

It may be observed that the two units U1 and U2 of the repository group G5 are deployed in the time period between T4 and T6 only after the deployment of the "Database" and "File" groups. Further as depicted in columns 1025-1026, the units U1 and U2 of the repository group G5 are deployed individually since the level of parallelism is 1.

Thus, FIG. 10 specifies an order of deployment based on which management system 150 may deploy the various deployment units received in the form of deployment package 510. It may be appreciated that though the order of deployment is depicted in a tabular form for convenience, any other suitable/appropriate format (for example as a queue) may be used by management system 150 for determining and/or maintaining such information (in data store 160).

As described with respect to step 390, at least some of the changes caused by the above noted deployment need to be activated before the changes are effective in the enterprise application. The manner in which such activation may be performed is described below with examples.

13. Activating Deployment

Figure 11:
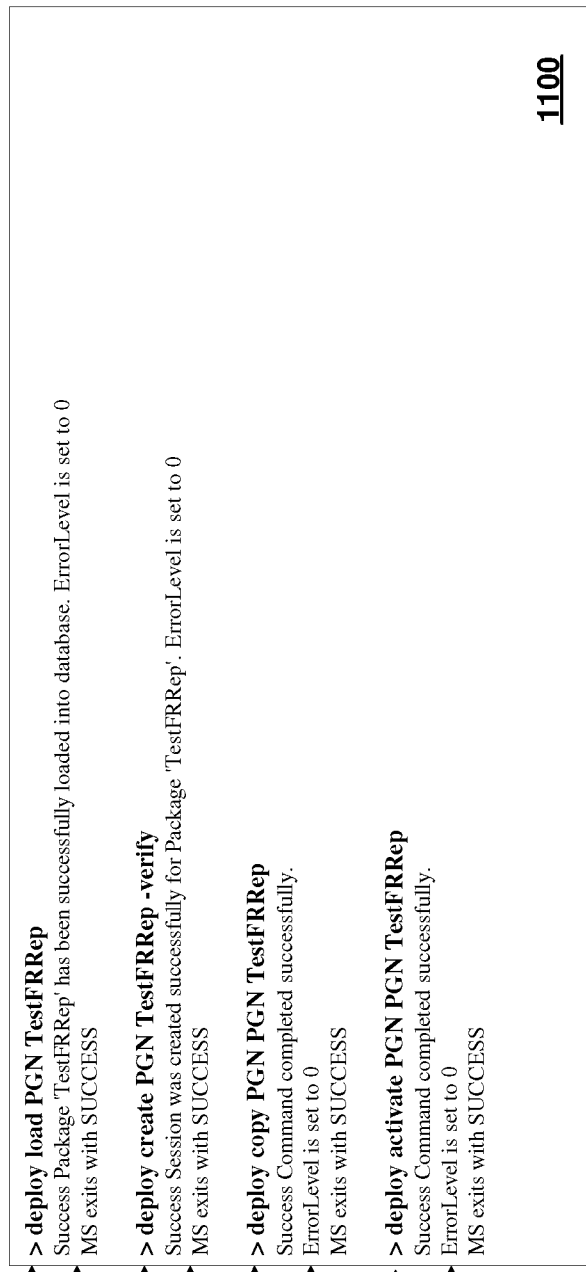
FIG. 11 depicts the manner in which an activation indication is received in an embodiment.

FIG. 11 depicts the manner in which an activation indication is received in an embodiment. The activation is described in the context of the related user interactions also, merely for completeness. Though the command for activation is depicted as indicating activation of all the deployed deployment units, it may be appreciated that the command may be suitably modified to indicate activation of only the deployment units of interest.

Display area 1100 (and each of display areas 1200, 1400 and 1600) depicts a command line interface (CLI) using which a user/administrator may issue commands (such as text 1110, shown with leading > and in bold) to management system 150. Each command contains pre-defined keywords such as "deploy", "create", "copy", etc using which the user/administrator may indicate a specific action to be performed.

On receiving a command, management system 150 initiates the action corresponding to the command (based on the keywords contained in the command) and transfers control back to the CLI, thereby enabling the user/administrator to issue further commands while the action is being performed.

Management system 150 may also display messages (such as text 1115 following the command) indicating the status of performance of the command in display area 1100. As such display area 1100 displays a sequence of pairs of commands (issued by a user/administrator) and corresponding messages (displayed by management system 150).

Text 1110 depicts a command specifying that a deployment package named "TestFRRep" is to be prepared for deployment. The corresponding response, text 1115 indicates that the deployment package has been successfully loaded into the local database (and is ready for deployment).

Text 1120 and 1140 depict commands that respectively specify that a session for deploying the prepared deployment package "TestFRRep" is to be created and then the deployment package is to be deployed. The corresponding response messages, text 1125 and 1145 indicate successful creation of the session and deployment of the deployment package. It may be observed that the command in text 1140 does not specify that the deployment is to be activated.

Text 1150 depicts a command (for activation) specifying that the deployed deployment package is to be activated (as indicated by the keyword "activate") with the corresponding response text 1155 indicating the successful activation of the deployed deployment units contained in the deployment package.

According to another aspect of the present invention, the user is provided the option of stopping and resuming deployment (as noted above with respect to steps 470 and 480). The corresponding user interface is described below with examples.

14. Stopping and Resuming Deployment

FIG. 12 depicts the manner in which deployment of deployment units is stopped and later resumed in an embodiment.

Text 1210, 1220, 1230 depict commands that respectively specify that a deployment package named "SRF" is to be prepared for deployment, a corresponding session for deployment is to be created and the deployment units contained in the deployment package are to be deployed. The corresponding responses text 1215, 1225 and 1235 indicate the successful completion of the requested actions.

It may be appreciated that text 1235 indicates that the command (depicted in text 1230) has been terminated, but the deployment is being performed in the background as indicated by the text 1245 in response to command 1240. Text 1245 indicates that a deployment session is already running and further deployment cannot be performed.

Text 1250 depicts a command for stopping deployment (as indicated by the STOP keyword). The corresponding response message text 1255 indicates successful cancellation of the deployment session (indicating that deployment has stopped). Such a command may represent the indication to stop, in step 470 noted above.

Text 1270 depicts an acknowledgement command, which is a pre-requisite to resuming deployment in the present embodiment, with the corresponding response message text 1275 indicating successful acknowledgement. It may be appreciated that in the present embodiment, no further deployment may be performed without first performing the acknowledgement (as indicated by the failure message in text 1265 shown in response to the deployment command in text 1260).

Text 1280 and 1290 depict respective command similar to 1220 and 1230, for creating a session for deployment, and to perform deployment, with text 1285 indicating successful creation of the session. The commands may together represent the indication to resume deployment as noted above with respect to step 480.

In response to receiving the two commands, management system 150 determines the deployment units that have not yet been deployed, and ensures only such deployment units (3 in count, shown in the Figure) are deployed further (as indicated by text 1295).

It may be appreciated that management system 150 may perform the customization of an enterprise application as described above (based on an enterprise profile provided by an administrator), without requiring further manual intervention from the administrator.

While such a feature may be convenient, there are often scenarios when an administrator may wish to have more control over the deployment process. An aspect of the present invention provides an administrator enhanced control over the deployment, as described in further detail below.

15. Deployment in Multiple Stages

Figure 13:
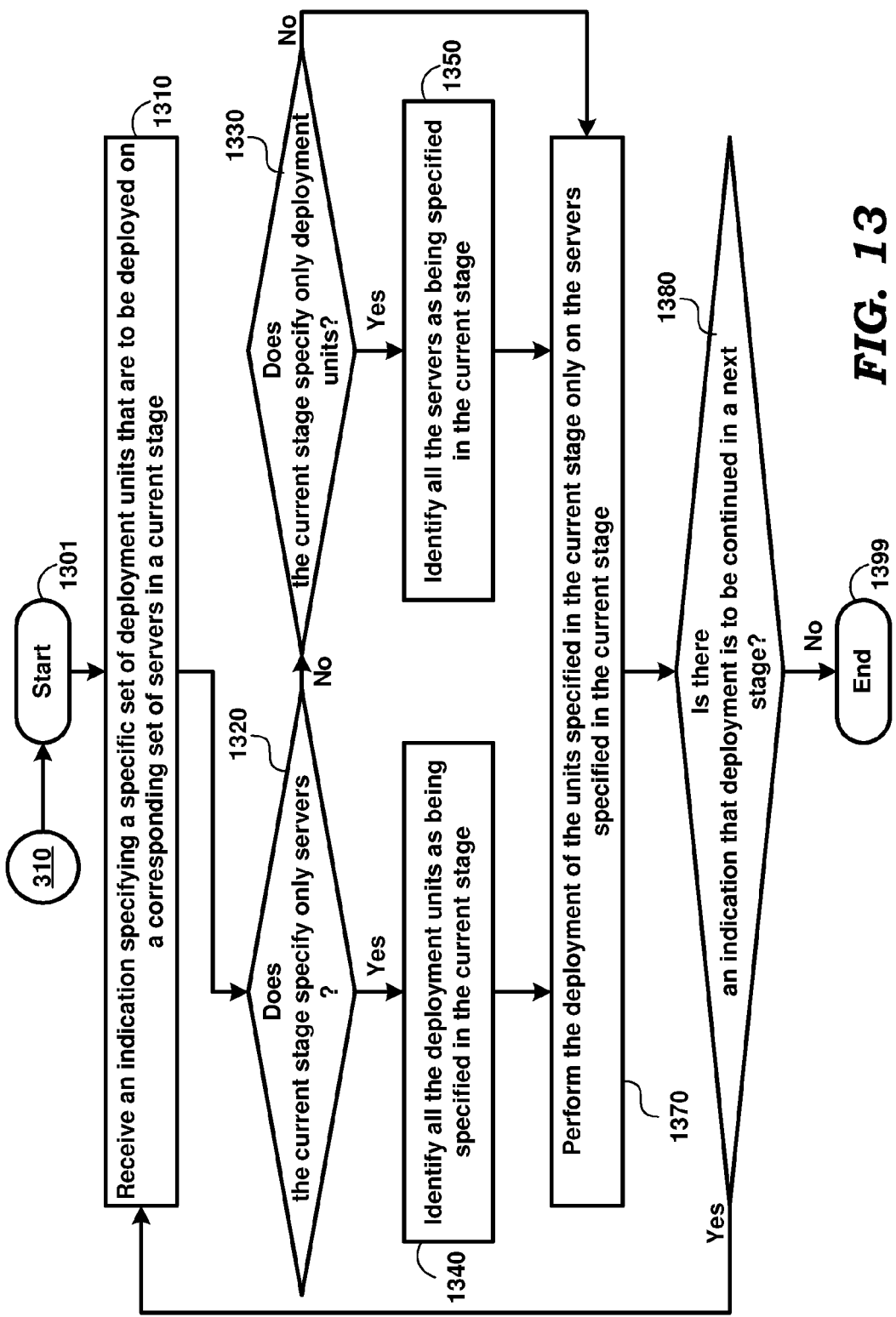
FIG. 13 is a flowchart illustrating the manner in which customizations of an enterprise application are deployed in multiple stages according to an aspect of the present invention.

FIG. 13 is a flowchart illustrating the manner in which customizations of an enterprise application are deployed in multiple stages according to an aspect of the present invention. As may be appreciated, in this approach, the administrator manually (e.g., by a command line interface, CLI) controls the sequence in which the deployment units are deployed consistent with the dependency/parallelism information in the enterprise profile.

The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 1301, in which control immediately passes to step 1310.

In step 1310, management system 150 receives an indication specifying a specific set of deployment units that are to be deployed on a corresponding set of servers in a corresponding current stage (first stage in the first iteration). Thus, each stage may indicate a corresponding set of deployment unit-server pairs, with each pair implying that the deployment unit is to be deployed on the server in the pair.

The indication may be received, for example, when an administrator issues an appropriate command from a CLI. The deployment units may be specified by an appropriate list or simply by a type of the deployment units. The servers also may be specified similarly, either by a list of individual servers or the server type (e.g., database server or file servers, in the example of FIG. 1).

In step 1320, management system 150 determines whether the current stage specifies only servers. Control passes to step 1340 if only servers are specified, and to step 1330 otherwise. In step 1340, management system 150 identifies all the deployment units as being specified in the current stage. Control then passes to step 1370.

In step 1330, management system 150 determines whether the current stage specifies only deployment units. Control passes to step 1350 if only deployment units are specified and to step 1370 otherwise. In step 1350, management system 150 identifies all the servers as being specified in the current stage (for the specified deployment units). Control then passes to step 1370.

In step 1370, management system 150 performs the deployment of the units specified in the current stage only on the corresponding servers specified in the current stage. The deployment may be performed, for example, as described above with respect to FIGS. 3 and 4 (for each of the servers).

In step 1380, management system 150 determines whether there is an indication that deployment is to be continued in a next stage. Control passes to step 1310 if the indication indicates there is at least one additional stage, and to step 1399 otherwise. The flowchart ends in step 1399.

Thus, an administrator by specifying desired deployment units and desired servers in each of the stages has more control over the deployment process. The manner in which deployment in multiple stages is indicated in one embodiment is described below with examples.

16. Example Illustrating Deployment in Multiple Stages

Figure 14:
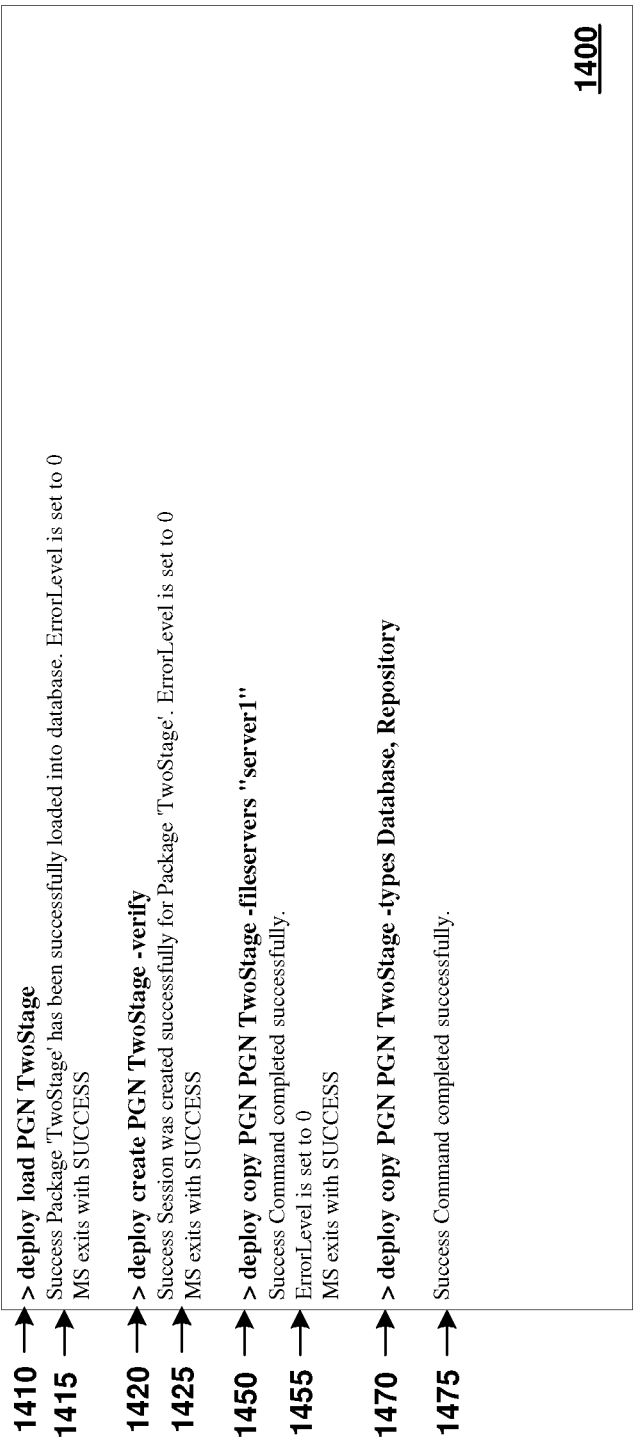
FIG. 14 depicts a manner in which a user/administrator may indicate the deployments to be performed in each of a sequence of stages in an embodiment.

FIG. 14 depicts a manner in which a user/administrator may indicate the deployments to be performed in each of a sequence of stages in an embodiment.

Texts 1410 and 1420 specify commands similar to text 1210/1220 respectively for preparing a deployment package (named "TwoStage") for deployment and for creating a session for deployment. Texts 1415 and 1425 indicate successful completion of the requested actions.

Text 1450 indicates that the deployment in a first stage is to be performed only on the file server (as indicated by keyword-fileserver) named "server1". The keyword further indicates that only deployment units of "File" type are to be deployed on server1.

On receiving such a command, management system 150 examines the descriptor data to determine the deployment units of "File" type, and then deploys the determined deployment units on "server1" based on the actions specified in the management information (corresponding to "File" type). Other deployment units are not deployed in this stage (as indicated by text 1455). Similarly, deployment is not performed on the servers not specified in this command.

Text 1470 indicates that the deployment in a second stage is to be performed only for the deployment types—"Database" and "Repository", as indicated by the key word "-types". As such, management system 150 performs deployment of only the indicated deployment units on the indicated servers (here all the servers, since none is specified), as indicated by the corresponding response shown in text 1475.

It should be noted that management system 150 may ensure that the deployment units deployed in an earlier stage are not redeployed in a later stage, even if the later stages indicates that the deployment units are to be deployed.

It is often required that the customizations sought to be deployed in the current stage be rolled back, for example, when the customizations are not deployed in the correct order. Such a need may be present in other circumstances (for example, when deployment is stopped or aborted in the middle) as well.

Management system 150 facilitates the rollback or recovery of the enterprise application by performing a backup operation before deployment and a restore operation (on receiving a rollback/recover request) on the corresponding servers. The manner in which management system 150 facilitate rollback/recovery is described below with examples.

17. Rolling Back Deployment

Figure 15:
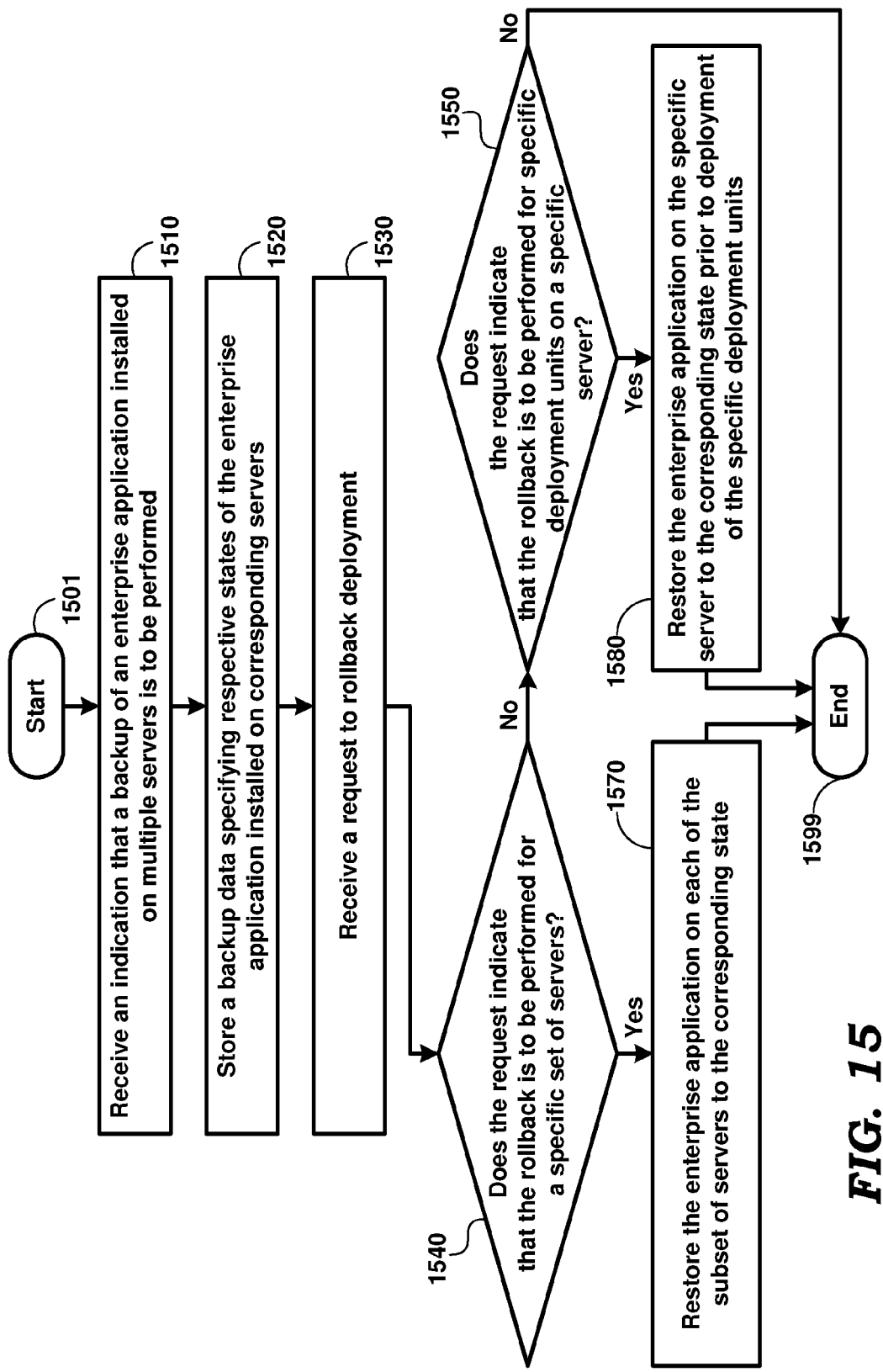
FIG. 15 is a flowchart illustrating the manner in which customizations of an enterprise application can be rolled back according to an aspect of the present invention.

FIG. 15 is a flowchart illustrating the manner in which customizations of an enterprise application can be rolled back according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 1501, in which control immediately passes to step 1510.

In step 1510, management system 150 receives an indication that a backup of an enterprise application installed on multiple servers is to be performed. The backup indication may be provided in the enterprise profile (controlled by an administrator). Alternatively, the indication may be specified in the management information as well.

In step 1520, management system 150 stores a backup data specifying respective states of the enterprise application installed on corresponding servers. Thus, with respect to FIG. 1, the state of the enterprise application on each of server system 190A and 190B and database server 180 may be stored (prior to deployment of the deployment units). In general, such backing up entails storing the relevant data in a memory (preferably a persistent storage such as data store 160)

In step 1530, management system 150 receives a request to rollback deployment (for example to perform recovery). Rollback generally refers to restoring the enterprise application to a state prior to customizations of the current stage. Such a restoring may be possible only when backup data representing the prior state is available (which implies that management system 150 would be designed to preserve such backup data in the previous step).

In step 1540, management system 150 determines whether the request indicates that the rollback is to be performed for a specific set of servers. The specific set of servers may be specified as an individual list or a type of servers (e.g., database or file servers). Control passes to step 1570 if the request indicates a specific set of servers and to step 1550 otherwise.

In step 1550, management system 150 determines whether the request indicates that the rollback is to be performed for a specific set of deployment units on a specific server. The specific set of deployment units may be specified as an individual list or as a type (e.g., database type or file type). Control passes to step 1580 if the request indicates a specific set of deployment units and to step 1599 otherwise.

In step 1570, management system 150 restores the enterprise application on each of the specified set of servers to the corresponding state based on the backup data. The backup data stored in step 1520 may be copied back to the corresponding specific server to restore the state. Control then passes to step 1599.

Similarly in step 1580, management system 150 restores the enterprise application on the specific server to the corresponding state prior to deployment of the specific deployment units. It is assumed that the changes caused by each deployment unit do not overlap with the changes caused by other deployment units and thus the rollback is performed for any of the specific deployment units requested by the administrator. Control then passes to step 1599, in which the flowchart ends.

Thus, management system 150 facilitates rolling back of the deployed customizations of an enterprise application. The manner in which backup and restore may be performed in one embodiment is described in detail below.

18. Example Illustrating Rolling Back of Deployment

In one embodiment, management system 150 (generates and) stores a backup data in data store 160 indicating the state of the enterprise application on the corresponding servers (server systems 190A-190B and database server 180). The specific type and amount of data to be stored generally depends on the changes that would be caused by the deployment units (the effects of which could be reversed in future), and will be apparent to one skilled in the relevant arts.

Management system 150 performs the backup in response to receiving a backup indication specified in the enterprise profile as shown in FIG. 9A (the value of "Yes" corresponding to the tag "<PerformBackup/>" in line 924). On receiving a rollback/recovery indication, management system 150 restores the state of the enterprise application on the corresponding servers based on the backup data.

FIG. 16A indicates the manner in which a rollback indication may be specified in one embodiment. Text 1610 specifies a command for performing deployment of deployment package named "pavan", with the corresponding response text 1615 indicating a failure in performance of the deployment. An administrator may accordingly wish to rollback the changes caused due to the failed deployment.

Accordingly, text 1630 and 1650 specify commands (issued by the administrator) for restoring the state prior to the failed deployment as indicated by the keyword "restore_session". As such, management system 150, on receiving such a rollback indication, may restore the state of the enterprise application to a state prior to the performance of the command in text 1610.

Thus, management system 150 may be designed to save the state information prior to performing each deployment command (e.g., text 1610), and when a restore command is received (e.g., text 1650), the state prior to the previous deployment command may be restored. It may be appreciated that on successful roll back (as indicated by texts 1635 and 1655), the administrator may redo deployment (as indicated by text 1680), for example, after resolving the issues that caused the previous deployment to fail.

In general, management system 150 performs the "backup" and "restore" operations based on the type of the deployment unit sought to be deployed. As such, management system 150 may generate and store backup data in data store 160 based on the deployment unit type as described in detail below.

Thus, for deployment units of "File" type, management system 150 may copy the files (sought to be replaced by the deployment units during deployment) to a backup folder. In one embodiment, the backup folder is specified in the enterprise profile corresponding to each deployment type. For example, line 945 in FIG. 9A indicates that the backup of the files sought to be replaced by deployment of deployment units of type "SRF" are to be maintained in the backup folder "\\sdchs20n270\upload".

For deployment units of "Database" and "Repository" types, management system 150 may maintain a copy of the rows (sought to be replaced by data/rows contained in the deployment units during deployment).

FIG. 16B depicts a backup data that is maintained in a local database on receiving a backup indication in one embodiment. The backup data may be generated prior to deployment of a deployment unit of type "Database" containing the database input file depicted in FIG. 6A.

Line 1671 (tag "<?xml>") indicates that the backup data is encoded in the form of XML. Lines 1672-1694 (between tags "<SiebelMessage>" and "</SiebelMessage>") depict the data in the rows that are sought to be overwritten in a database during deployment. In particular, lines 1675-1677 and 1679-1685 specify the old values in the rows sought to be inserted corresponding to the lines 617-631 and 634-660 of FIG. 6A and FIG. 6B. It may be observed that the old values are similar to the new values (of the corresponding rows) since the same data is sought to be inserted.

During roll back, the data contained in the database may be modified based on the back up data to a state prior to the deployment of the deployment unit which caused the changes to the database. For example, the rows (containing the new values) inserted during deployment may be deleted and the old values stored in the backup data may be re-inserted in the database to cause restoration of the state prior to deployment.

The description is continued with respect to the manner in which management system 150 is implemented in an embodiment.

19. Management System

Figure 17:
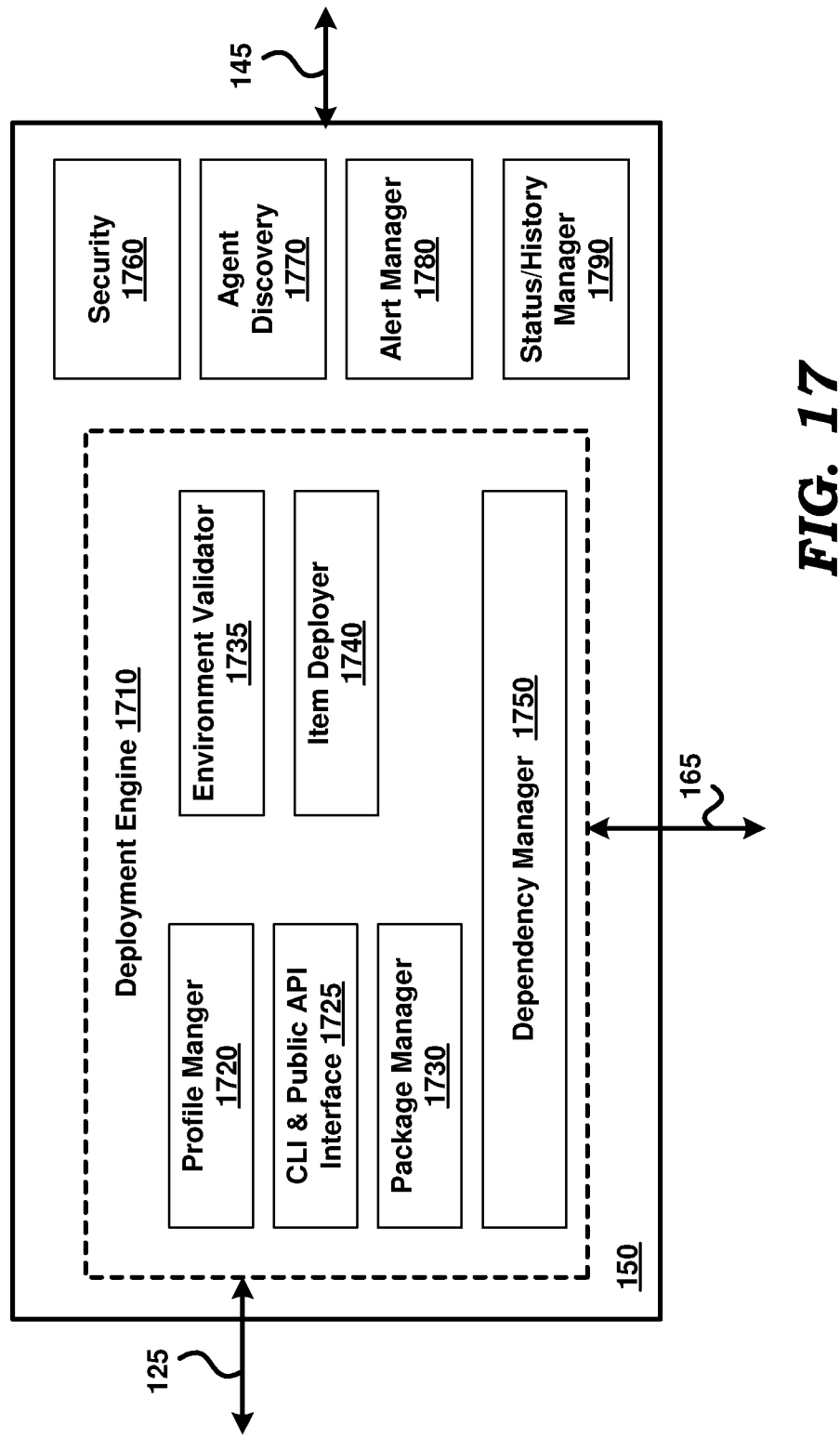
FIG. 17 is a block diagram illustrating the internal details of a management system (orchestrating deployment of customizations) in one embodiment.

FIG. 17 is a block diagram illustrating the internal details of management system 150 (orchestrating deployment of customizations) in one embodiment.

Each of deployment engine 1710, security 1760, agent discovery 1770, alert manager 1780, and status/history manager 1790 represents a software program executing in a run time environment (for example, an operating system along with appropriate device driver softwares) provided by management system 150.

In an implementation, deployment engine 1710 is shown containing profile manager 1720, CLI & Public API interface 1725, package manager 1730, environment validator 1735, item deployer 1740 and dependency manager 1750. Each block of management system 150 is described in detail below.

Deployment engine 1710 on execution receives a deployment package (containing the deployment units and the descriptor data) from vendor system 130 via path 125. Deployment engine 1710 also receives an enterprise profile from either vendor system 130 or from data store 160 (via path 165), which may be provided by an administrator using an appropriate interface (not shown). Deployment engine 1710 may also receive (from vendor system 130) and maintain a management information in data store 160 using path 165.

Profile manager 1720 on receiving an enterprise profile, verifies that the types/categories specified in the enterprise profile matches the types/categories of the deployment units specified in the management information. Further, profile manager 1720 along with environment validator 1735 may also verify that the servers (and the validation rules) specified in the enterprise profile are satisfied for the enterprise application sought to be customized.

CLI & Public API interface 1725 receives commands/function calls specified by users/administrators using appropriate interfaces (for example a command line interface or CLI) and performs the appropriate actions indicated by the commands. For example, on receiving a command such as "deploy", CLI & Public API interface 1725 may start the deployment of the received deployment package.

Package manager 1730 on receiving a deployment package first verifies that the types/categories specified in the descriptor data is present in the management information. Further, package manager 1730 also verifies that the information specified in the descriptor data is consistent with the deployment units contained in the received deployment package.

Environment validator 1735 sends requests to agents executing on server systems 190A-190B and/or database server 180 (via path 145) and inspects the corresponding responses to determine whether servers/validation rules specified in the enterprise profile are present in the enterprise.

Item deployer 1740 communicates with the agents executing on the servers of the enterprise (via path 145) to facilitate the deployment of a single item (a deployment unit or a deployment group). Such communication (requests and responses) between management system 150 and the agents executing on the server system may be pre-defined based on the connectivity details of the enterprise.

Dependency manager 1750 inspects the received enterprise profile to determine the dependency data, the level of parallelism and the deployment level corresponding to each type/category. Dependency manager 1750 then determines an order of deployment based on the previously determined values. The order of deployment may be maintained in data store 160 (using path 165) in any convenient format (for example, a queue).

Dependency manager 1750 may then perform the deployment of the deployment units contained in the received deployment package by sending (or indicating) the appropriate deployment units/groups to item deployer 1740 as per the determined order of deployment.

On receiving a deployment unit for deployment on a specific server, item deployer 1740 first inspects the descriptor data to determine the type/category of the received deployment unit. Item deployer 1740 then deploys the deployment unit based on the manner of configuration indicated in the management information.

As such, item deployer 1740 may send requests for invoking specific services/methods of specific software components such as "ADMFileMBean" (executing in a run time environment provided by an agent installed on the specific server) as indicated by the management information corresponding to the type/category of the deployment unit. Item deployer 1740 may internally create multiple threads of execution for deploying multiple deployment units on the same or different servers.

Security 1760 ensures that the deployment of customization is performed in the enterprise in accordance to the security requirements of the enterprise. As such, security 1760 may require that all requests/responses sent/received via path 145 by deployment engine 1710 be routed through security

1760 to ensure that only specific server systems/database servers are accessed by deployment engine 1710.

Agent discovery 1770 communicates (via path 145) with other systems (such as server systems 190A-190B and database server 180) existing in the enterprise to determine the existence of agents installed on the systems. Agent discovery 1770 may then maintain a list of agents available in the enterprise, thereby simplifying the process of verification and deployment performed by deployment engine 1710.

Alert manager 1780 sends alert messages (either to a display or to an appropriate interface) based on the configuration provided by a user/administrator. The alerts may be configured to be sent on start/end of deployment, in the scenario that an error occurs during deployment, when the amount of processing power/memory required for a deployment exceeds a specific limit etc.

Status/History manager 1790 also communicates with the agents executing on the different servers in the enterprise and determines the status of deployment of the various deployment units. Status/History manger may maintain the status information in data store 160 (using path 165) and also send the information to deployment engine 1710 (specifically dependency manager 1750) thereby facilitating deployment of deployment units that have not yet been deployed.

It may be observed the deployment of the customizations of an enterprise application executing on a set of servers is performed by management system 150 by communicating with an agent (executing software components) installed on each of the set of servers. Accordingly, the description is continued describing the manner in which an agent is implemented in one embodiment.

20. Agents on Server Systems

Figure 18:
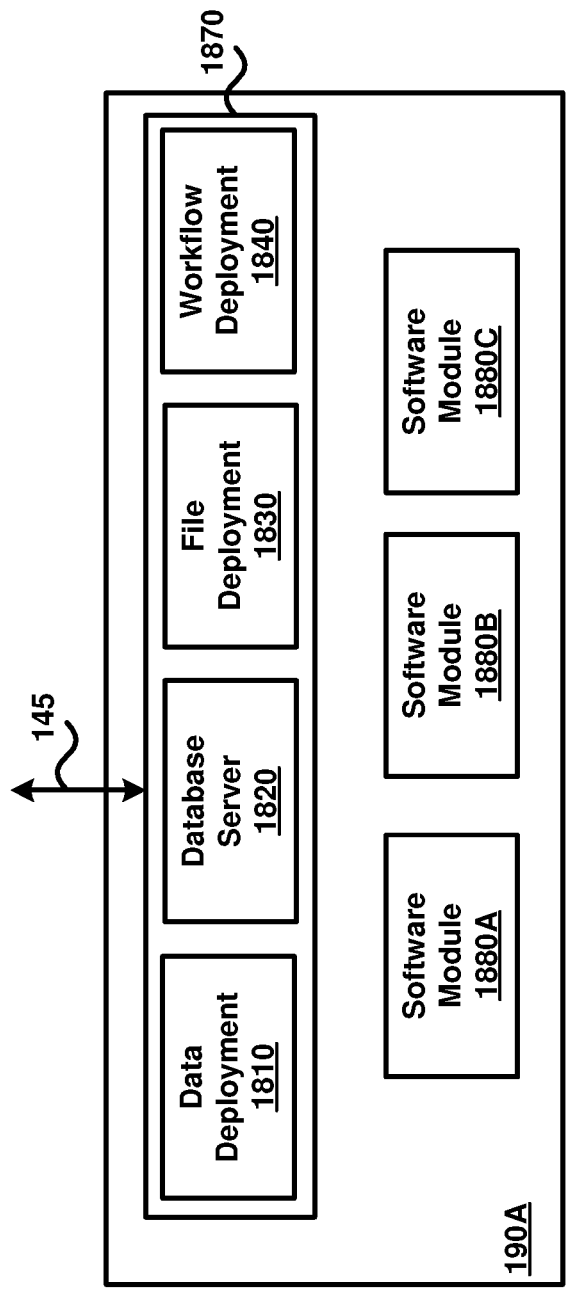
FIG. 18 is a block diagram illustrating the manner in which an agent is implemented on a server sought to be customized in one embodiment.

FIG. 18 is a block diagram illustrating the manner in which an agent is implemented on a server sought to be customized in one embodiment. Server system 190A is shown containing agent 1870 and software modules 1880A-1880C. Each block is described in detail below.

Each software module 1880A-1880C represents a group of instructions designed to perform a set of specific tasks. The software modules together represent the portion of the enterprise application executing on server system 190A. Once installed, each software module is generally available to perform the corresponding set of tasks, but need to be configured for the specific enterprise in which the application is installed.

The configuration, performed according to various aspects of the present invention, is external (contrasted with software patching, in which the instructions themselves are replaced/modified) to the pre-installed software modules. Once a deployment unit is deployed, the effect of the change of configuration is reflected as a customization of the enterprise application during execution of the software module. Thus, the content of the deployment units described above defines the manner of configuration of the effected software modules.

Agent 1870 represents a software program executing in the run time environment of server system 190A (a server sought to be customized). Agent 1870 in turn provides an environment for execution of software components such as data deployment 1810, database server 1820, file deployment 1830 and workflow deployment 1840.

In one embodiment, agent 1870 is implemented using Java Management Extensions (JMX™) technology available from Sun Microsystems, Inc. and each of the software components is implemented as MBeans (management beans) executing in the environment provided by agent 1870. As such, file deployment 1830 may correspond to "ADMFileMBean" specified in the management information.

File deployment 1830 represents a software component designed to deploy deployment units of type "File" by copying the files contained in the deployment unit to the corresponding folders specified in the management information (for example, based on lines 843-847 of FIG. 8B).

Workflow deployment 1840 represents a software component designed to deploy deployment units of type "Workflow" by invoking appropriate installation modules (not shown) as specified by the management information with the workflow data contained in the deployment units.

Data deployment 1810 represents a software component designed to deploy deployment units of type "Repository", while database server 1820 represents a software component designed to deploy deployment units of type "Database". Data deployment 1810 and database server 1820 may perform the deployment by invoking appropriate services provided by a database server on which the deployment units are sought to be deployed. In one embodiment, each database/repository server is pre-installed with a sub-agent designed to perform the appropriate services as described in detail below.

Figure 19:
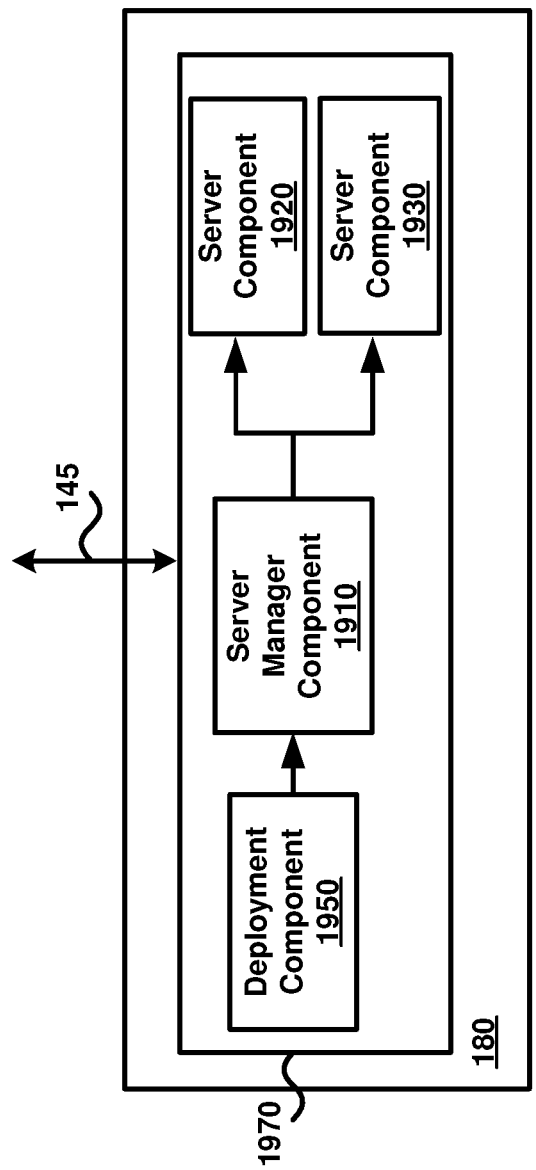
FIG. 19 is a block diagram illustrating the manner in which a sub-agent is implemented on a database/repository server sought to be customized in one embodiment.

FIG. 19 is a block diagram illustrating the manner in which a sub-agent is implemented on a database/repository server sought to be customized in one embodiment. Each block is described in detail below.

Agent 1970 represents a software program executing in the run time environment of database server 180 (sought to be customized). Agent 1970 in turn provides an environment for execution of software components such as deployment component 1950 in association with other components pre-installed in database server 180 such as server manager component 1910 and server components 1920 and 1930.

Deployment component 1950 represents a software component designed to deploy deployment units of type "Database" and "Repository" using server manager component 1910 and server components 1920 and 1930 already installed in database server 180.

In the above described embodiment, deployment component 1950 is implemented as three individual MBeans namely application deploymentobject manager (ADMObjMgr), deployment manager processor (ADMProc) and application deployment manager batch processor (ADMBatchProc).

The ADMObjMgr and ADMProc server components drive the process of deploying database and repository deployment units and are responsible for initiating the deployment, activation, and status update steps by invoking corresponding business service methods, which in turn invoke EAI business services, specialized business services, implemented in database server 180.

The ADMObjMgr server component receives and performs requests to invoke business service methods associated with the deployment of application customizations, including issuing database server requests through the Server Request Broker (alias SRBroker). During deployment, the ADMObjMgr is the first entry point into the database server infrastructure from the agent.

The ADMProc server component processes the deployment or activation of database and repository deployment units. It is also responsible for sending the deployment status back to management system 150. The ADMBatchProc server component is a batch-mode server component used for exporting database items to file from the CLI. It functions similar to Application Deployment Processor but processes a batch load of deployment units.

It should be appreciated that the above-described features of management system 150 may be implemented in a combination of one or more of hardware, software and firmware (though embodiments are described as being implemented in the form of software instructions). The description is continued with respect to an embodiment in which various features are operative by execution of corresponding software instructions.

21. Digital Processing System

Figure 20:
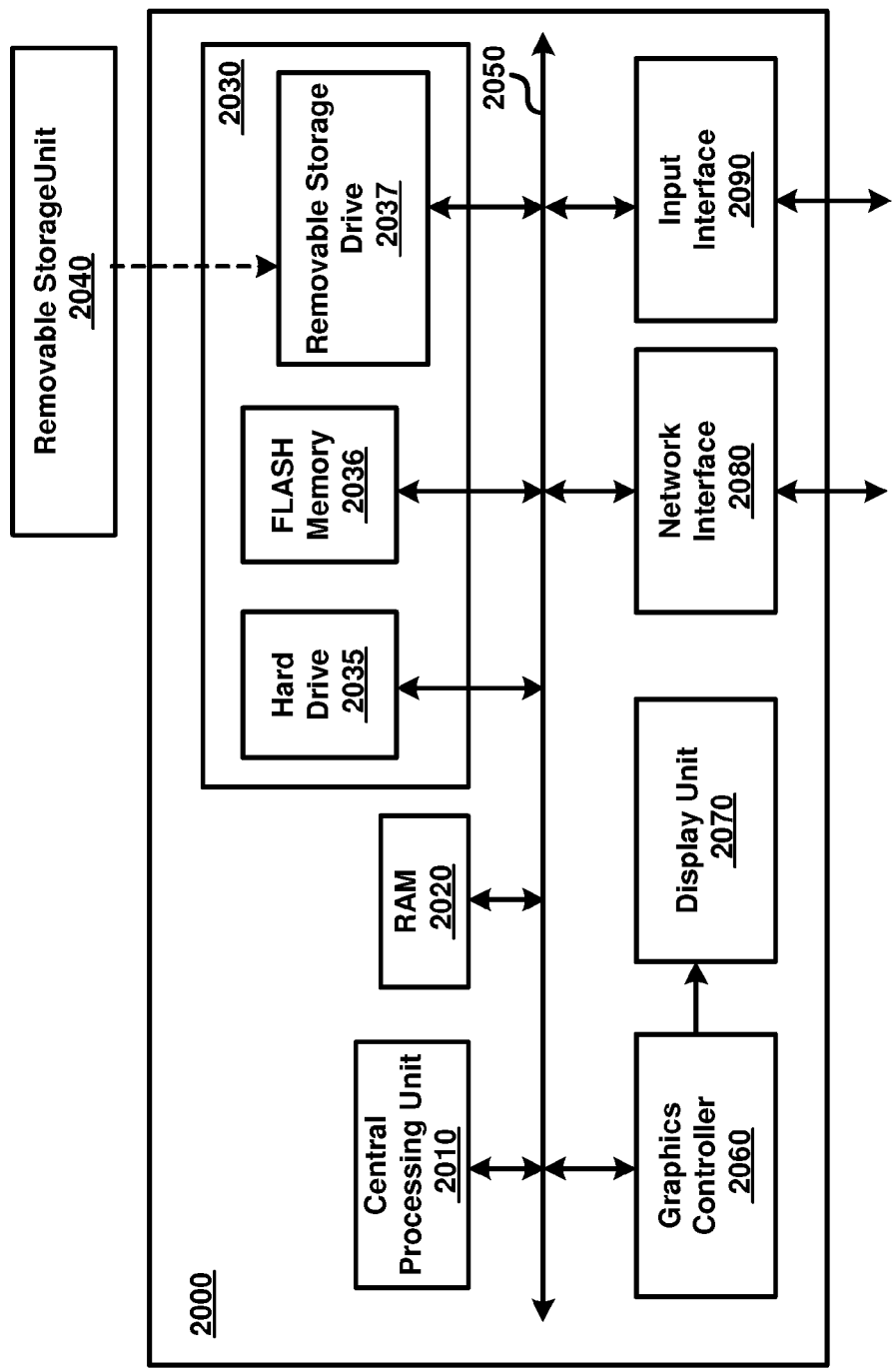
FIG. 20 is a block diagram illustrating the details of a digital processing system in which various aspects of the present invention are operative by execution of appropriate software instructions.

FIG. 20 is a block diagram illustrating the details of digital processing system 2000 in which various aspects of the present invention are operative by execution of appropriate software instructions. Digital processing system 2000 may correspond to management system 150.

Digital processing system 2000 may contain one or more processors (such as a central processing unit (CPU) 2010), random access memory (RAM) 2020, secondary memory 2030, graphics controller 2060, display unit 2070, network interface 2080, and input interface 2090. All the components except display unit 2070 may communicate with each other over communication path 2050, which may contain several buses as is well known in the relevant arts. The components of FIG. 20 are described below in further detail.

CPU 2010 may execute instructions stored in RAM 2020 to provide several features of the present invention. CPU 2010 may contain multiple processing units, with each processing unit potentially being designed for a specific task. Alternatively, CPU 2010 may contain only a single general-purpose processing unit. RAM 2020 may receive instructions from secondary memory 2030 using communication path 2050.

Graphics controller 2060 generates display signals (e.g., in RGB format) to display unit 2070 based on data/instructions received from CPU 2010. Display unit 2070 contains a display screen to display the images defined by the display signals. Input interface 2090 may correspond to a keyboard and a pointing device (e.g., touch-pad, mouse). Network interface 2080 provides connectivity to a network (e.g., using Internet Protocol), and may be used to communicate with other connected systems (such as server systems 190A-190B or database server 180) of FIG. 1.

Secondary memory 2030 may contain hard drive 2035, flash memory 2036, and removable storage drive 2037. Secondary memory 2030 may store the data and software instructions, which enable digital processing system 2000 to provide several features in accordance with the present invention. Some or all of the data and instructions may be provided on removable storage unit 2040, and the data and instructions may be read and provided by removable storage drive 2037 to CPU 2010. Floppy drive, magnetic tape drive, CD-ROM drive, DVD Drive, Flash memory, removable memory chip (PCMCIA Card, EPROM) are examples of such removable storage drive 2037.

Removable storage unit 2040 may be implemented using medium and storage format compatible with removable storage drive 2037 such that removable storage drive 2037 can read the data and instructions. Thus, removable storage unit 2040 includes a computer readable (storage) medium having stored therein computer software and/or data. However, the computer (or machine, in general) readable medium can be in other forms as well (e.g., non-removable, random access, etc.).

Removable storage unit 2040 or a hard disk installed in hard drive 2035 provides software in accordance to several aspects of the present invention to digital processing system 2000. CPU 2010 may then retrieve the software instructions, and execute the instructions to provide various features of the present invention described above.

22. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A non-transitory machine readable medium storing one or more sequences of instructions for causing a management system to facilitate deployment of a plurality of customizations of an enterprise application, a plurality of software modules constituting entire software instructions of said enterprise application, wherein said plurality of software modules includes a first software module pre-installed in a state suitable for execution on a first server and a second server of said plurality of servers, wherein execution of said one or more sequences of instructions by one or more processors contained in said management system causes said management system to perform the actions of:

receiving a plurality of deployment units, each of said plurality of deployment units containing data defining a manner of configuration of at least some of said software modules already installed on corresponding servers to attain said plurality of customizations of said enterprise application according to the requirements of an enterprise, wherein said plurality of deployment units includes a first deployment unit for customizing said first software module;

receiving an enterprise profile indicating a corresponding set of deployment units to be used in customizing said enterprise application in corresponding one of said plurality of servers according to the requirements of said enterprise, wherein a portion of said enterprise profile indicates that said first deployment unit is to be used to customize said enterprise application in both of said first server and said second server; and orchestrating the configuration of said plurality of software modules already installed on said plurality of servers according to the data specified in said plurality of deployment units and said enterprise profile, wherein said orchestrating orchestrates the configuration of said first software module already installed on both of said first server and said second server in the corresponding manner according to the data specified in said first deployment unit and said portion of said enterprise profile, such that said enterprise application having said plurality of software modules pre-installed in said state suitable for execution is further adapted according to the requirements of said enterprise, said orchestrating comprises:

receiving a level of parallelism specifying a number of deployment units that may be simultaneously deployed on said plurality of servers;

examining a dependency data indicating a first set of deployment units which need to be deployed prior to deployment of a first deployment unit, wherein said first set of deployment unit and said first deployment unit are contained in said plurality of deployment units; and performing configuration of said plurality of software modules based on said first set of deployment units before performing configuration based on said first deployment unit in response to said examining, wherein said performing ensures that the maximum number of deployment units deployed simultaneously on said plurality of servers does not exceed said number of deployment units.

2. The non-transitory machine readable medium of claim 1, wherein said level of parallelism is specified associated with a type of deployment units, wherein said number of deployment units is all of said type, wherein said dependency data and said level of parallelism are specified in said enterprise profile.

3. The non-transitory machine readable medium of claim 1, further comprising one or more instructions for:
receiving an activation indication that the configuration of specific ones of said plurality of software modules is to be activated before the configuration by a corresponding deployment unit is operative in said enterprise application; and
activating only the configurations caused by said specific ones of said plurality of deployment units in response to receiving said activation indication.

4. The non-transitory machine readable medium of claim 3, wherein a first deployment unit causes data to be changed in a database server, wherein said activating clears a cache of said database server,
wherein a second deployment unit causes a change in the operation of a software module executing on an application server, wherein said activating restarts said application server,
wherein a third deployment unit causes a file to be copied to a location in a web server, wherein said activating causes a user to reconnect to said web server,
wherein said first deployment unit, said second deployment unit and said third deployment unit are contained in said specific ones of said plurality of deployment units, and said database server, said application server and said web server are contained in said plurality of servers.

5. The non-transitory machine readable medium of claim 1, wherein said orchestrating further comprises one or more instructions for:
receiving a first indication to stop the configuration of said plurality of software modules in said state suitable for execution during the configuration;
stopping the configuration in response to receiving said first indication;
receiving a second indication to resume the configuration;
determining, in response to receiving said second indication, a subset of said plurality of deployment units which have not yet been used for configuring said plurality of software modules; and
performing configuration using said subset of said plurality of deployment units,
whereby a user can control resumption of orchestrating after said stopping, by sending said second indication.

6. The non-transitory machine readable medium of claim 1, wherein said orchestrating further comprises one or more instructions for:
receiving a sequence of indications indicating corresponding stages, wherein each of said sequence of indications specifies a corresponding set of servers and a corresponding set of deployment units; and
performing configuration on the set of servers using the corresponding set of deployment unit specified in a stage only after configuration on the set of servers using the corresponding set of deployment units specified in a previous stage, wherein said stage and said previous stage are indicated by said sequence of indications.

7. The non-transitory machine readable medium of claim 6, wherein the set of servers in said previous stage comprises a database server and a deployment unit of said previous stage contains a data of interest to be deployed on said database server,
wherein the set of servers in said stage comprises a first server and a deployment unit of said stage provides configuration of a software module executing in said first server, wherein said configuration of said software module requires said data of interest in said database server for operation,
wherein said data of interest is copied to said database server in said previous stage before configuration of said software module on said first server in said stage.

8. The non-transitory machine readable medium of claim 6, wherein said stage specifies a subset of said plurality of servers without specifying any deployment units, wherein all of said plurality of deployment units are deployed only on said subset of said plurality of servers in said stage.

9. The non-transitory machine readable medium of claim 6, wherein said stage specifies a subset of said plurality of deployment units without specifying any servers, and said subset of said plurality of deployment units are deployed on all of said plurality of servers in said stage.

10. The non-transitory machine readable medium of claim 9, wherein all of said subset of said plurality of deployment units are of a same type, wherein said same type is one of a file type, a database type, a repository type and a workflow type.

11. The non-transitory machine readable medium of claim 1, wherein said orchestrating further comprises one or more instructions for:
storing a backup data specifying a corresponding state of said enterprise application deployed on each of said plurality of servers;
receiving a request to rollback said deployment in a first server, said first server being contained in said plurality of servers; and
restoring said enterprise application on said first server to a state prior to said deployment using said backup data.

12. The non-transitory machine readable medium of claim 11, wherein said request indicates that said rollback is to be performed on only a subset of said plurality of servers, wherein said restoring restores the corresponding state on each of said subset of plurality of servers only.

13. The non-transitory machine readable medium of claim 1, wherein said orchestrating further comprises one or more instructions for:
storing a backup data specifying a corresponding state of said enterprise application in a first server prior to deployment of a first deployment unit contained in said plurality of deployment units, said first server being contained in said plurality of servers;
receiving a request to rollback deployment of said first deployment unit; and
restoring said enterprise application on said first server using said backup data to cause said corresponding state prior to deployment of said first deployment unit to be restored.

14. The non-transitory machine readable medium of claim 1, further comprising one or more instructions for:
receiving a descriptor data indicating a type of each of said plurality of deployment units and a management information indicating said manner corresponding to each type,
wherein said orchestrating determines a corresponding type of each of said plurality of deployment units and performs the configuration of each software module according to said management information for said corresponding type.

15. The non-transitory machine readable medium of claim 14, wherein said type comprises a file type, wherein a deployment unit of said file type contains a data file, wherein said enterprise profile indicates a location at which said data file would be accessed by said enterprise application, wherein said orchestrating comprises copying said data file to said location.

16. The non-transitory machine readable medium of claim 14, wherein said type comprises a database type, wherein a deployment unit of said database type contains a database input file containing a plurality of rows to be written into a database server, wherein said database server is comprised in said plurality of servers and is specified by said enterprise profile, wherein said orchestrating comprises writing said plurality of rows into said database server.

17. The non-transitory machine readable medium of claim 14, wherein said type comprises a repository type, wherein a deployment unit of said repository type contains a repository file containing a plurality of repository objects to be written into a database server, wherein said database server is comprised in said plurality of servers and is specified by said enterprise profile, wherein said orchestrating comprises writing said plurality of repository objects into said database server.

18. The non-transitory machine readable medium of claim 14, wherein said type comprises a workflow type, wherein a deployment unit of said workflow type contains a workflow data which is to be provided as an input to an installation module specified by said enterprise profile, wherein said orchestrating comprises executing said installation module with said workflow data as input in each of a set of servers specified by said enterprise profile.

19. A computing system comprising:

a plurality of servers pre-installed with a plurality of software modules constituting entire software instructions of an enterprise application; and a management system to facilitate deployment of a plurality of customizations of said enterprise application, said management system comprising:

a package manager to receive a plurality of deployment units together in the form of a deployment package containing one or more files, each of said plurality of deployment units containing data defining a manner of configuration of at least some of said software modules already installed on corresponding servers to attain said plurality of customizations of said enterprise application according to the requirements of an enterprise, said deployment package containing a first deployment unit for configuration of a first software module and also a second deployment unit for configuration of a second software module;

a profile manager to receive an enterprise profile indicating a corresponding set of deployment units to be used in customizing said enterprise application in each of said plurality of servers; and a dependency manager to orchestrate the configuration of said plurality of software modules already installed on said plurality of servers according to the data specified in said plurality of deployment units and said enterprise profile such that said enterprise application having said plurality of software modules pre-installed in said state suitable for execution is further adapted according to the requirements of said enterprise wherein to orchestrate said dependency manager is operable to:

receive a level of parallelism specifying a number of deployment units that may be simultaneously deployed on said plurality of servers;

examine a dependency data indicating a first set of deployment units which need to be deployed prior to deployment of a first deployment unit, wherein said first set of deployment unit and said first deployment unit are contained in said plurality of deployment units; and perform configuration of said plurality of software modules based on said first set of deployment units before performing configuration based on said first deployment unit in response to said examine, wherein said dependency manager ensures that the maximum number of deployment units deployed simultaneously on said plurality of servers does not exceed said number of deployment units.

20. A method of facilitating deployment of a plurality of customizations of an enterprise application, said enterprise application containing a plurality of software modules pre-installed in a state suitable for execution on a plurality of servers, said method being performed in a management system, said method comprising:

receiving a deployment package containing a plurality of deployment units and a descriptor data indicating a type of each of said plurality of deployment units;

receiving a management information indicating a manner of configuration of at least some of said software modules already installed on corresponding servers to attain said plurality of customizations of said enterprise application corresponding to each type of deployment unit according to the requirements of an enterprise, wherein said manner of configuration is performed based on the data contained in the deployment units of the corresponding type;

receiving an enterprise profile indicating a corresponding set of deployment units to be used in customizing said enterprise application in each of said plurality of servers, wherein said enterprise profile further indicates a level of parallelism specifying a number of deployment units that may be simultaneously deployed on said plurality of servers associated with each type, and a dependency data indicating a set of deployment units which need to be deployed prior to deployment of a specific deployment unit, wherein said set of deployment unit and said specific deployment unit are contained in said plurality of deployment units;

selecting a first set of deployment units contained in said plurality of deployment units, wherein said dependency data indicates that said first set of deployments unit need to be deployed prior to deployment of other deployment units contained in said plurality of deployment units;

identifying a first set of servers on which said first set of deployment units are to be deployed based on said enterprise profile;

determining a corresponding type of each of said first set of deployment units; and performing configuration of said plurality of software modules pre-installed on said first set of servers according to the data specified in said first set of deployment units such that said enterprise application having said plurality of software modules pre-installed in said state suitable for execution is further adapted according to the requirements of said enterprise, wherein the configuration of each software module is performed according to said management information for said corresponding type based on said determining, wherein said performing ensures that the maximum number of deployment units deployed simultaneously for each type does not exceed said corresponding number of deployment units as specified by said corresponding level of parallelism for the type.

21. The method of claim 20, further comprising:

receiving an activation indication that the configuration of specific ones of said plurality of software modules is to be activated before the configuration by a corresponding deployment unit is operative in said enterprise application; and activating only the configurations caused by said specific ones of said plurality of deployment units in response to receiving said activation indication.

22. The method of claim 20, further comprising:

receiving a sequence of indications indicating corresponding stages, wherein each of said sequence of indications specifies a corresponding set of servers and a corresponding set of deployment units, wherein said performing performs configuration on the set of servers using the corresponding set of deployment unit specified in a stage only after configuration on the set of servers using the corresponding set of deployment units specified in a previous stage, wherein said stage and said previous stage are indicated by said sequence of indications.

23. A method of enabling a user to deploy a plurality of customizations of an enterprise application, said enterprise application containing a plurality of software modules pre-installed in a state suitable for execution on a plurality of servers, said method comprising:

sending to a management system a deployment package containing a plurality of deployment units and a descriptor data indicating a type of each of said plurality of deployment units, wherein each type is associated with a manner of configuration of at least some of said software modules already installed on corresponding servers to attain said plurality of customizations of said enterprise application according to the requirements of an enterprise; and sending to said management system an enterprise profile indicating a corresponding set of deployment units to be used in customizing said enterprise application in each of said plurality of servers, wherein said enterprise profile further indicates a level of parallelism specifying a number of deployment units that may be simultaneously deployed on said plurality of servers associated with each type, and a dependency data indicating a set of deployment units which need to be deployed prior to deployment of a specific deployment unit, wherein said set of deployment unit and said specific deployment unit are contained in said plurality of deployment units, wherein said management system orchestrates configuration of said plurality of software modules already installed on said plurality set of servers according to said enterprise profile, data specified in said plurality of deployment units, and the manner of configuration associated with the type of each of said plurality of deployment units such that said enterprise application having said plurality of software modules pre-installed in said state suitable for execution is further adapted according to the requirements of said enterprise, while ensuring that the maximum number of deployment units deployed simultaneously for each type does not exceed said number of deployment units.

24. The method of claim 23, further comprising:

sending an activation indication that the configuration of specific ones of said plurality of software modules is to be activated before the configuration by a corresponding deployment unit is operative in said enterprise application, wherein said management system activates only the configurations caused by said specific ones of said plurality of deployment units in response to receiving said activation indication.

25. The method of claim 23, further comprising:

sending a sequence of indications indicating corresponding stages, wherein each of said sequence of indications specifies a corresponding set of servers and a corresponding set of deployment units, wherein said management system performs configuration on the set of servers using the corresponding set of deployment unit specified in a stage only after configuration on the set of servers using the corresponding set of deployment units specified in a previous stage, wherein said stage and said previous stage are indicated by said sequence of indications.

* * * * *